(12) United States Patent
El-Hibri et al.

(10) Patent No.: US 9,000,087 B2
(45) Date of Patent: Apr. 7, 2015

(54) THERMOPLASTIC POLYMER MIXTURES, AND APPLICATIONS THEREOF

(75) Inventors: Mohammad Jamal El-Hibri, Atlanta, GA (US); Edward Ryan, Roswell, GA (US); Brian A. Stern, Duluth, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 522 days.

(21) Appl. No.: 12/596,023

(22) PCT Filed: Apr. 23, 2008

(86) PCT No.: PCT/EP2008/054954
§ 371 (c)(1),
(2), (4) Date: Oct. 15, 2009

(87) PCT Pub. No.: WO2008/116939
PCT Pub. Date: Oct. 2, 2008

(65) Prior Publication Data
US 2010/0144955 A1    Jun. 10, 2010

Related U.S. Application Data

(60) Provisional application No. 60/913,395, filed on Apr. 23, 2007, provisional application No. 60/915,973, filed on May 4, 2007.

(51) Int. Cl.
| | | |
|---|---|---|
| C08L 27/18 | (2006.01) | |
| C08L 79/08 | (2006.01) | |
| C08L 61/00 | (2006.01) | |
| C08G 75/23 | (2006.01) | |
| C08L 71/00 | (2006.01) | |
| C08L 81/02 | (2006.01) | |
| C08L 81/06 | (2006.01) | |

(52) U.S. Cl.
CPC ............... *C08G 75/23* (2013.01); *C08L 71/00* (2013.01); *C08L 81/02* (2013.01); *C08L 81/06* (2013.01); *C08G 2650/40* (2013.01); *C08L 79/08* (2013.01)

(58) Field of Classification Search
CPC .......... C08L 27/18; C08L 79/08; C08L 61/00
See application file for complete search history.

(56) References Cited

U.S. PATENT DOCUMENTS

| 3,833,544 A | 9/1974 | Takekoshi et al. |
|---|---|---|
| 3,887,588 A | 6/1975 | Cook et al. |
| 3,965,125 A | 6/1976 | Meyers |
| 4,017,511 A | 4/1977 | Williams |
| 4,024,110 A | 5/1977 | Takekoshi |
| 4,421,588 A | 12/1983 | Davies |
| 4,684,699 A | 8/1987 | Robeson |
| 4,703,081 A * | 10/1987 | Blackwell et al. ............ 524/592 |
| 4,910,289 A | 3/1990 | Harris |
| 4,975,470 A * | 12/1990 | Matzner et al. ............... 521/134 |
| 5,916,958 A * | 6/1999 | Kelly et al. ................... 524/497 |
| 7,151,138 B2 * | 12/2006 | Nishihata et al. ............. 525/153 |

FOREIGN PATENT DOCUMENTS

| CN | 1186819 A | 7/1998 |
|---|---|---|
| EP | 0062830 A1 | 10/1982 |
| EP | 0241019 A2 | 10/1987 |
| EP | 0321215 A2 | 6/1989 |
| EP | 0418719 A1 | 3/1991 |
| EP | 1416015 A1 | 5/2004 |
| WO | WO 2006/037758 A1 * | 4/2006 |

OTHER PUBLICATIONS

Lai Mingfang et al. "Study on strengthening the interface compatibility of heat-resistant resin blends", Gongcheng Suliao Yingyong, 2000, 28(11), p. 1-3—CAS 135:331971 + attached CAS Abstract in English language.

Kancheng Mai et al. "Double melting phenomena of poly(phenylene sulfide) and its blends", Gaofenzi Xuebao, 1994, (2), p. 229-33—CAS 122:162231 + attached CAS Abstract in English language.

* cited by examiner

*Primary Examiner* — Randy Gulakowski
*Assistant Examiner* — Jeffrey Washville
(74) *Attorney, Agent, or Firm* — Oblon, McClelland, Maier & Neustadt, L.L.P.

(57) ABSTRACT

Thermoplastic polymer mixture (M) comprising
  at least one poly(aryl ether ketone) (P1),
  at least one poly(arylene sulfide) (P2), and
  between 0 and 25 wt. % of the total weight of the thermoplastic mixture (M), of a thermoplastic polymer material (P3) consisting of (i) at least one poly(biphenyl ether sulfone) (P3a), and/or (ii) at least one poly(ether imide) (P3b), and/or at least one poly(ether imide sulfone) (P3c),
wherein:
  the combined weight amount of the poly(aryl ether ketone) (P1) and the poly(arylene sulfide) (P2), based on the total weight of the polymer mixture (M), is of at least 30%, and
  the weight amount of the poly(aryl ether ketone) (P1), based on the combined weight of the poly(aryl ether ketone) (P1) and the poly(arylene sulfide) (P2), is of at most 90%.

24 Claims, No Drawings

THERMOPLASTIC POLYMER MIXTURES, AND APPLICATIONS THEREOF

CROSS-REFERENCE TO RELATED APPLICATIONS

The present application is a U.S. national stage application under 35 U.S.C. §371 of International Application No. PCT/EP2008/054954 filed Apr. 23, 2008, which claims priority to U.S. provisional application No. 60/913,395 filed Apr. 23, 2007 and U.S. provisional application No. 60/915,973 filed May 4, 2007, the whole content of each of these applications being herein incorporated by reference for all purposes.

FIELD OF THE INVENTION

The present invention relates to a certain improved thermoplastic poly(aryl ether ketone)-poly(arylene sulfide) mixture. The improvement is achieved by incorporating a third polymer material into the thermoplastic mixture.

Moreover, the present invention also relates to an article comprising the improved thermoplastic mixture.

BACKGROUND OF THE INVENTION

U.S. Pat. No. 4,684,699 (to Union Carbide) describes alloys comprising from about 2 to about 98 weight percent of a poly(arylene sulfide) and from about 98 to about 2 weight percent of a poly(aryl ketone) which exhibit a good combination of properties. In particular, they display a higher strength than would be expected from the weight average constituent values. On page 4, 1. 40-42 of US'699, it is mentioned that the alloys may further contain an aromatic polysulfone, an aromatic polycarbonate or an aromatic polyhydroxyether, and example 5 describes a ternary alloy composed of 30 wt. % poly(ether ether ketone), 30 wt. % poly(phenylene sulfide) and 40% bisphenol A polysulfone. The binary and ternary alloys of US'699 suffer notably from poor toughness related properties, including a low impact resistance and a low tensile elongation.

U.S. Pat. No. 4,703,081 (to Phillips Petroleum) describes ternary polymer alloys containing at least one of a poly(aryl ketone) and a poly(aryl sulfone), a poly(arylene sulfide) and a poly(amide imide). Besides, US'081 exemplifies also certain homogenous physical blends prepared by mixing a poly(phenylene sulfide) with a poly(ether ether ketone) and a polyether sulfone. Again, the ternary alloys of US'081 suffer notably from poor toughness related properties, including a low impact resistance and a low tensile elongation.

U.S. Pat. No. 7,151,138 (to Kureha) describes resin compositions comprising a resin component containing 40 to 99% by mass of a poly(aryl ketone), 1 to 60% by mass of a poly(arylene sulfide) and 0.1 to 5 parts by mass par 100 parts by mass of the resin component of at least one thermosetting imide resin (emphasis added on "thermosetting") selected from the group of a polyfunctional unsaturated imide compound and a thermoset product thereof, such as bisallylnagiimide BANI-M, BANI-X and BANI-H resins. As the result of the incorporation of that thermosetting imide resin, the compositions of US'138 exhibit improved compatibility, improved moldability, improved melt flowability and improved mechanical properties, especially tensile strength and bending strength; based on the results of table 1, the tensile elongation and/or the Izod impact strength of certain exemplified resin compositions might also be very slightly improved when compared to the corresponding binary blends without the thermosetting imide resin, but the improvement, if any, is so low that apparently Kureha did not deem appropriate to comment on it in any manner. The thermosetting imide resins of US'138 are high specialty polymers; they are expensive and have limited availability. In addition, because of their thermosetting nature, their blending with molten poly(aryl ketone) and molten poly(arylene sulfide) is more delicate, as the chemical nature of the blend changes substantially when subject to heating; besides, thermoset imide resins, when incorporated after thermosetting (as used in example 6), require by essence a preliminary curing step, and are more difficultly incorporated to poly(aryl ketone)-poly(arylene sulfide) blends as they are not melt processible as such.

Similarly, CN 1,186,819 (to the Changchun Institute Applied Chemistry) describes the use of an alcohol solution of a thermoset imide monomer to coat a polyphenyl thioether homogeneously. A poly(aryl ether ketone)-poly(phenyl thioether) material is prepared, wherein the polyimide is synthesized and coupled at 150° C.-250° C. to increase the compatibility between the phases of the poly(phenyl thioether) and the poly(aryl ether ketone).

Still within the same framework, the same Changchun Institute of Applied Chemistry published in 2000 a technical paper in *Gongcheng Suliao Yingyong*, 28(11), pages 1-3 directed to the thermal and mechanical properties and morphological structures of blends of a very particular poly(aryl ether ketone) known as phenolphtalein poly(ether ketone) or cardo-PEK (PEK-C) with a poly(phenylene sulfide). The blends may further include 1%~2% (wt.) of a "Polymerization of Monomeric Reactant" PMR-POI polyimide.

Finally, U.S. Pat. No. 4,910,289 (to Amoco Corp.) describes a composition having increased crystallization rates comprising (a) from about 98 to about 99.9 percent by weight of a miscible blend comprising a poly(aryl ether ketone) and at least one amorphous polymer selected from the group consisting of polyetherimide, poly(amide-imide) and polyimide, and (b) from about 0.1 to about 2 percent by weight of a poly(arylene sulfide) homo- or copolymer, as crystallization aid. The composition of example 1 is composed of 49.5 wt. % of a poly(ether ether ketone), 49.5 wt. % of a poly(ether imide) and 1 wt. % of a poly(phenylene sulfide). Notwithstanding the presence of a small amount of poly(phenylene sulfide) in the poly(aryl ether ketone)-poly(ether imide) alloys of US'289, these ones are far from displaying the good combination of properties, in particular the high strength, of the poly(aryl ether ketone)-poly(aryl sulfide) alloys of US'699. Also, their toughness-related properties may be not high as desirable.

There remains a strong need for a polymer material that would substantially retain the beneficial of properties of the poly(aryl ether ketone)-poly(aryl sulfide) blends of the prior art, in particular (i) their high strength, (ii) their easiness to be melt processed, and (iii) their cost-attractive, while exhibiting substantially improved toughness-related properties (such as a substantially increased impact resistance and/or a substantially higher tensile elongation at break) and/or a substantially increased heat deflection temperature.

DESCRIPTION OF THE INVENTION

It has been found surprisingly that these expectations are met by a thermoplastic polymer mixture (M) comprising
  at least one poly(aryl ether ketone) (P1),
  at least one poly(arylene sulfide) (P2), and
  between 0 and 25 wt. % of the total weight of the thermoplastic mixture (M), of a thermoplastic polymer material (P3) consisting of (i) at least one poly(biphenyl ether sulfone) (P3a), and/or (ii) at least one poly(ether imide) (P3b), and/or at least one poly(ether imide sulfone) (P3c), wherein:

the combined weight amount of the poly(aryl ether ketone) (P1) and the poly(arylene sulfide) (P2), based on the total weight of the polymer mixture (M), is of at least 30%, and the weight amount of the poly(aryl ether ketone) (P1), based on the combined weight of the poly(aryl ether ketone) (P1) and the poly(arylene sulfide) (P2), is of at most 90%.

The thermoplastic polymer mixture (M) is a mixture of at least three thermoplastic polymer materials, namely (P1), (P2) and (P3). Polymers are well known to the skilled person. Polymer are material that contain repeating or recurring monomer units; polymers may be made by reacting monomer units so they are bonded to one another to form a chain of repeating and/or recurring units. Some polymers are thermoplastic materials. Thermoplastic materials are also well known to the skilled person. Thermoplastic materials undergo softening or melting upon heating, and returning to a solid state when cooled, and may be subjected to repeated heating and cooling cycles with no substantial chemical change in the material, in contrast with thermosetting plastics (or thermosets) which are polymer materials that irreversibly cure to a stronger form.

Advantageously, the mixture (M) is homogenous. As used herein, the terms "homogeneous mixture" include mixture of miscible polymers, and mixtures of partially miscible or immiscible polymers that may form a sea/island structure or have separate continuous and discontinuous phases. Thus term "homogeneous" is used herein in the macroscopic sense to indicate that the discontinuous phase, if present, is evenly dispersed through the continuous phase, e.g., islands are evenly dispersed throughout a sea of matrix material; there is no restriction on the particle size of the islands of the discontinuous phase.

In the mixture (M), the weight amount of the thermoplastic polymer material (P3) ranges between 0 and 25 wt. %, based on the total weight of the mixture (M). The weight amount of the thermoplastic polymer material (P3) is preferably of at least 3 wt. % and more preferably of at least 5 wt. %, based on the total weight of the mixture (M). On the other hand, the weight amount of the thermoplastic polymer material (P3) is preferably of at most 20 wt. %, more preferably of at most 15 wt. %, and still more preferably of at most 12 wt. %, based on the total weight of the mixture (M).

In the mixture (M), the weight amount of the thermoplastic polymer material (P3) ranges generally between 0 and 25 wt. %, based on the combined weight amount of the poly(aryl ether ketone) (P1), the poly(arylene sulfide) (P2) and the thermoplastic polymer material (P3). The weight amount of the thermoplastic polymer material (P3) is preferably of at least 3 wt. %, more preferably of at least 6 wt. %, and still more preferably of at least 8 wt. %, based on the combined weight amount of the poly(aryl ether ketone) (P1), the poly (arylene sulfide) (P2) and the thermoplastic polymer material (P3). On the other hand, the weight amount of the thermoplastic polymer material (P3) is preferably of at most 30 wt. %, more preferably of at most 20 wt. %, still more preferably of at most 15 wt. %, and the most preferably of at most 12 wt. %, based on the combined weight amount of the poly(aryl ether ketone) (P1), the poly(arylene sulfide) (P2) and the thermoplastic polymer material (P3).

In the mixture (M), the combined weight amount of the poly(aryl ether ketone) (P1) and the poly(arylene sulfide) (P2), based on the total weight of the mixture (M), is of at least 30%. It is preferably of at least 50% and more preferably of at least 60%, based on the total weight of the mixture (M). In certain embodiments, good results were obtained the combined weight amount of the poly(aryl ether ketone) (P1) and the poly(arylene sulfide) (P2), based on the total weight of the mixture (M), was of at least 70%, very good results were obtained when the same combined weight amount was of at least 80%, and excellent results were obtained when the same combined weight amount was of about 90%, based on the total weight of the mixture (M). In certain other embodiments, in particular when friction-and-wear resistant thermoplastic polymer mixtures were prepared, good results were obtained when the combined weight amount of the poly(aryl ether ketone) (P1) and the poly(arylene sulfide) (P2), based on the total weight of the mixture (M), was below 80%, very good results were obtained when the same combined weight amount was below 70%, and excellent results were obtained when the same combined weight amount was below 65%, based on the total weight of the mixture (M).

In the mixture (M), the weight amount of the poly(aryl ether ketone) (P1), based on the combined weight of the poly(aryl ether ketone) (P1) and the poly(arylene sulfide) (P2), is of at most 90%. The weight amount of the poly(aryl ether ketone) (P1), based on the combined weight of the poly(aryl ether ketone) (P1) and the poly(arylene sulfide) (P2), is preferably of at most 80% and more preferably of at most 70%, based on the combined weight of the poly(aryl ether ketone) (P1) and the poly(arylene sulfide) (P2). On the other hand, the weight amount of the poly(aryl ether ketone) (P1) is generally of at least 10%, based on the combined weight of the poly(aryl ether ketone) (P1) and the poly (arylene sulfide) (P2); it may be of at least 20%, at least 30%, or at least 40%; it is preferably of at least 50% and more preferably of at least 55% and still more preferably of at least 60%, based on the combined weight of the poly(aryl ether ketone) (P1) and the poly(arylene sulfide) (P2).

The mixture (M) may comprises from 45 to 75 wt % of a poly(ether ether ketone) [as the poly(aryl ether ketone) (P1)], and from 55 to 25% by weight of a poly(arylene sulfide) [as the poly(arylene sulfide) (P2)], wherein percent by weight is based upon the total weight of the poly(ether ether ketone) and the poly(arylene sulfide).

In the mixture (M), the combined weight amount of the poly(aryl ether ketone) (P1), the poly(arylene sulfide) (P2) and the thermoplastic polymer material (P3), based on the total weight of the mixture (M), ranges generally from 50 to 100%. It is preferably of at least 60% and more preferably of at least 65%, based on the total weight of the mixture (M). In certain embodiments, good results were obtained when the combined weight amount of the poly(aryl ether ketone) (P1), the poly(arylene sulfide) (P2) and the thermoplastic polymer material (P3), based on the total weight of the mixture (M), was of at least 75%, very good results were obtained when the same combined weight amount was of at least 90%, and excellent results were obtained when the same combined weight amount was of about 100%, based on the total weight of the mixture (M). In certain other embodiments, in particular when friction-and-wear resistant thermoplastic polymer mixtures were prepared, good results were obtained when the combined weight amount of the poly(aryl ether ketone) (P1), the poly(arylene sulfide) (P2) and the thermoplastic polymer material (P3), based on the total weight of the mixture (M), was below 90%, very good results were obtained when the same combined weight amount was below 75%, and excellent results were obtained when the same combined weight amount was of about 70%, based on the total weight of the mixture (M).

The poly(aryl ether ketone) (P1)

While any polymer comprising several recurring units comprising an arylene group, an ether group and a ketone group polymer could be labeled as a poly(aryl ether ketone) [referring to the etymological meaning of the term], including certain specialty ketone-containing polymers like phenolphtalein poly(ether ketone), the poly(aryl ether ketone)s of substantial industrial interest do comply with a more strict definition, as used herein.

Thus, for the purpose of the present invention, the term "poly(aryl ether ketone)" is intended to denote any polymer of which more than 50 wt. % of the recurring units are ketone-containing recurring units (R1) of one or more of the following formulae:

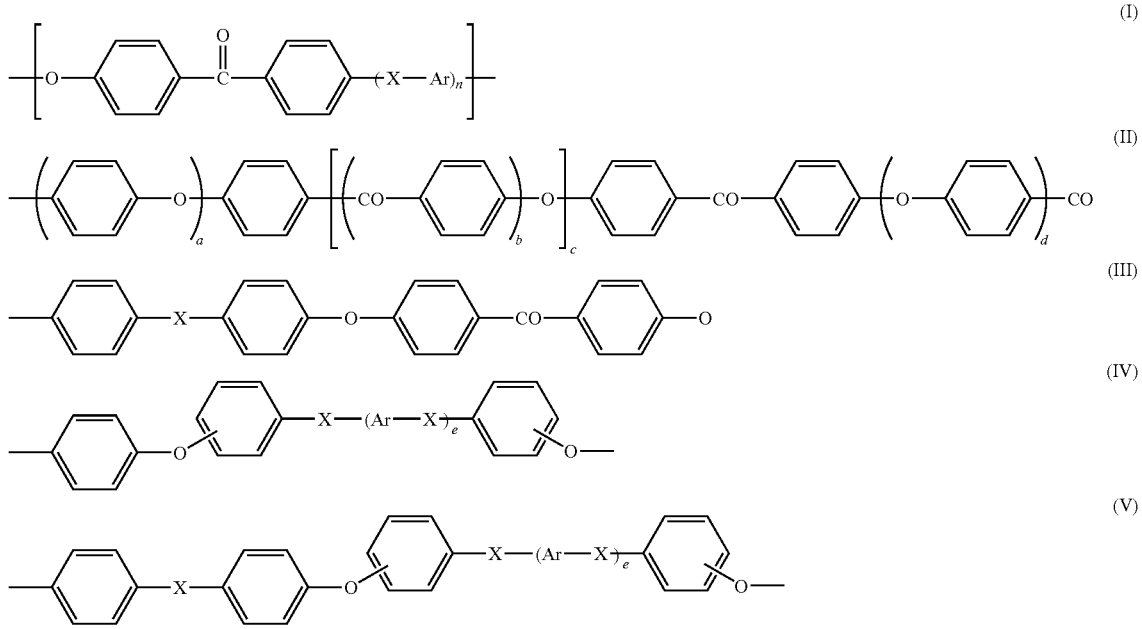

wherein:
Ar is independently a divalent aromatic radical selected from phenylene, biphenylene or naphthylene,
X is independently O, C(═O) or a direct bond,
n is an integer of from 0 to 3,
b, c, d and e are 0 or 1,
a is an integer of 1 to 4, and
preferably, d is 0 when b is 1.

Recurring units (R1) may notably be chosen from:

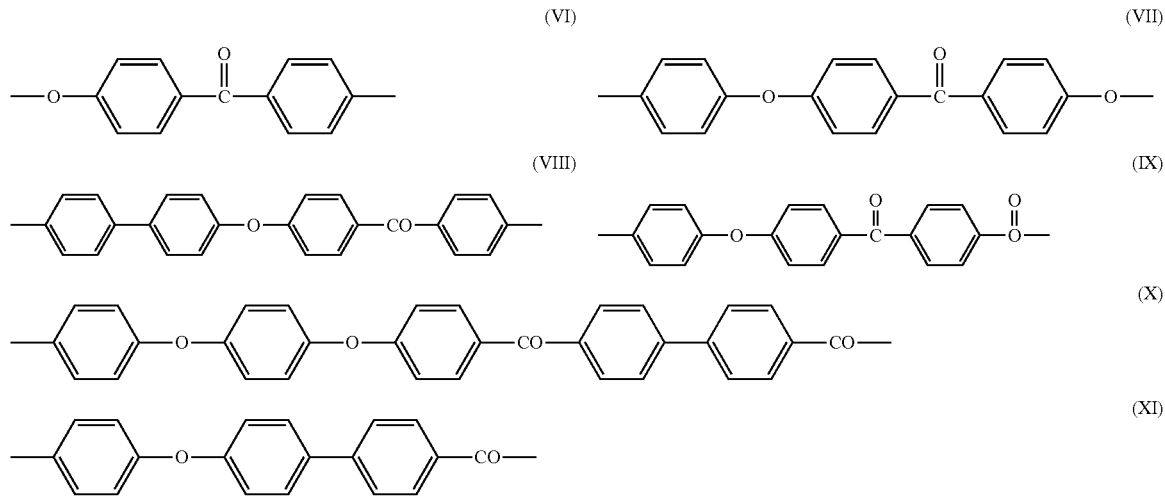

-continued

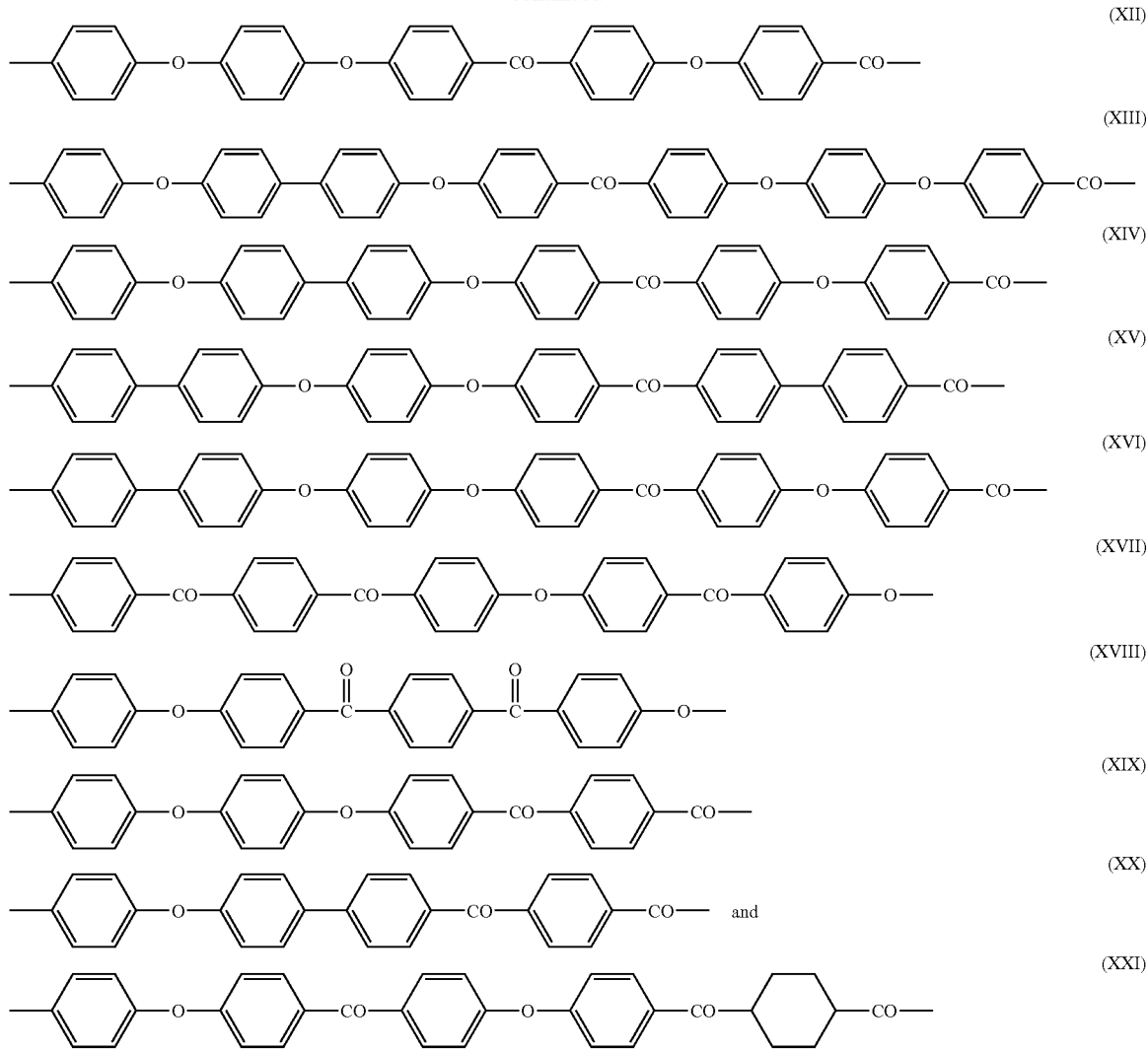

Preferably, recurring units (R1) are chosen from:

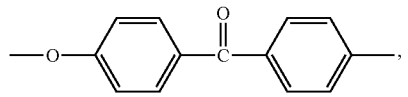
(VI)

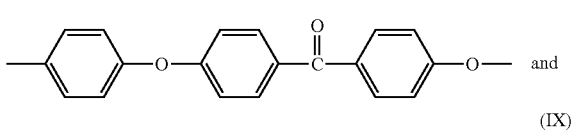
(VII) and (IX)

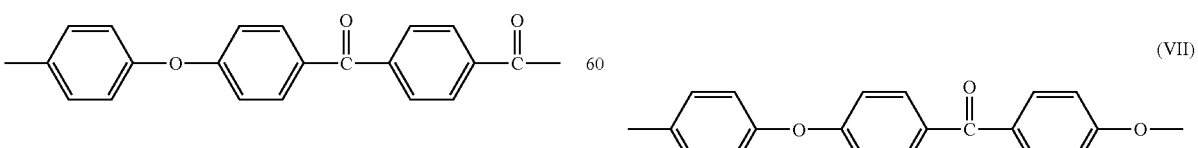

The poly(aryl ether ketone) (P1) is preferably selected from the group consisting of poly(ether ether ketone), poly(ether ketone), poly(ether ketone ketone) and mixtures thereof.

For the purpose of the present invention, a poly(ether ketone) is intended to denote any polymer of which more than 50 wt. % of the recurring units are recurring units (R1) of formula (VI).

For the purpose of the present invention, a poly(ether ether ketone) is intended to denote any polymer of which more than 50 wt. % of the recurring units are recurring units (R1) of formula (VII).

For the purpose of the present invention, a poly(ether ketone ketone) is intended to denote any polymer of which more than 50 wt. % of the recurring units are recurring units (R1) of formula (IX).

More preferably, recurring units (R1) are:

(VII)

Preferably more than 70 wt. %, and more preferably more than 85 wt. % of the recurring units of the poly(aryl ether ketone) (P1) are recurring units (R1). Still more preferably, essentially all the recurring units of the poly(aryl ether ketone) (P1) are recurring units (R1). The most preferably, all the recurring units of the poly(aryl ether ketone) (P1) are recurring units (R1).

Excellent results were obtained when the poly(aryl ether ketone) (P1) was a poly(ether ether ketone) homopolymer, i.e. a polymer of which essentially all, if not all, the recurring units were of formula (VII). VICTREX® 150 P and VICTREX® 450 P PEEKS from Victrex Manufacturing Ltd., and GATONE® and KETASPIRE® PEEKS from Solvay Advanced Polymers, L.L.C. are examples of poly(ether ether ketone) homopolymers.

The poly(arylene sulfide) (P2)

For the purpose of the present invention, a poly(arylene sulphide) (P2) is intended to denote a polymer of which more than 5 wt. % of the recurring units are recurring units (R2) are units of the following formula:

   (R2)

wherein the Ar group denotes an optionally substituted arylene group, such a phenylene or a naphthylene group, which is linked by each of its two ends to two sulfur atoms (forming thus sulphide groups) via a direct C—S linkage. Preferred recurring units Ar are optionally substituted p-phenylene (resulting in recurring units (R2) like

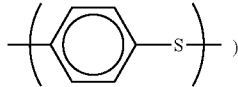

and optionally substituted m-phenylene (resulting in recurring units (R2) like

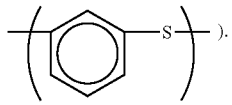

The optionally substituted arylene group Ar may be unsubstituted, which is often preferred.

In certain embodiments, the optionally substituted arylene group Ar may be substituted by one or more substituting groups, including but not limited to halogen atoms, $C_1$-$C_{12}$ alkyls, $C_7$-$C_{24}$ alkylaryls, $C_7$-$C_{24}$ aralkyls, $C_6$-$C_{18}$ aryls, $C_1$-$C_{12}$ alkoxy groups, and $C_6$-$C_{18}$ aryloxy groups, and substituted or unsubstituted arylene sulphide groups themselves, the arylene groups of which are also linked by each of their two ends to two sulfur atoms forming sulphide groups via a direct C—S linkage, like in:

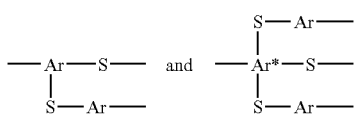

thereby creating branched polymer chains. It goes without saying that, in the poly(arylene sulphide) (P2), such branched polymer chains can be present to the extent that they do not impair the thermoplastic feature of the polymer material. When the amount of branched polymer chains is too high, substantial cross-linking can occur, causing an infusible tridimensional polymer network to be formed, i.e. a thermoset polymer material out of the scope of the present invention.

The poly(arylene sulphide) contains preferably more than 25 wt. %, more preferably more than 50 wt. %, and still more preferably more than 90 wt. % of recurring units (R2). Most preferably, it contains no recurring unit other than (R2).

A preferred poly(arylene sulphide) is poly(phenylene sulphide), i.e. a polymer of which more than 5 wt. % of the recurring units are recurring units of one or more formula of the general type:

   (R2a)

wherein the pPh group denotes an optionally substituted p-phenylene group which is linked by each of its two ends to two sulfur atoms forming sulphide groups via a direct C—S linkage.

pPh may be unsubstituted, which is often preferred.

In certain embodiments, pPh may be substituted by one or more substituting groups, including but not limited to halogen atoms, $C_1$-$C_{12}$ alkyls (resulting in substituted units (R2a) like)

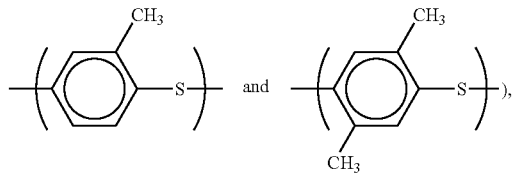

$C_7$-$C_{24}$ alkylaryls, $C_7$-$C_{24}$ aralkyls, $C_6$-$C_{18}$ aryls, $C_1$-$C_{12}$ alkoxy groups, $C_6$-$C_{18}$ aryloxy groups, and substituted or unsubstituted arylene sulphide groups themselves (possibly, substituted or unsubstituted p-phenylene sulphide groups themselves), the arylene groups of which are also linked by each of their two ends to two sulfur atoms forming sulphide groups via a direct C—S linkage, such as:

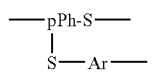

(like

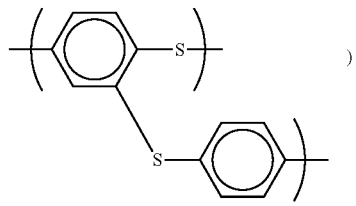

and

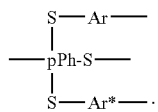

The poly(phenylene sulphide) contains preferably more than 25 wt. %; more preferably more than 50 wt. %, and still more preferably more than 90 wt. % of recurring units (R2a).

The poly(arylene sulphide), in particular the poly(phenylene sulphide), may further comprise recurring units other than (R2); non limitative examples of recurring units other than (R2) are those recurring units (R2*) capable of being formed by the reaction between Na$_2$S and a dihalocompound of general formula Cl—Ar$^o$-D-Ar$^o$—Cl through the elimination of the chlorine atoms from the dihalocompound:

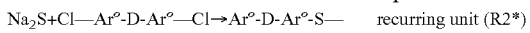

wherein Ar$^o$ is an optionally substituted arylene group and D may be any diradical other than sulphide (—S—) or than a sulphide-diterminated diradical (—S-D'-S—, where D' may be any diradical).

Both fragments —Ar$^o$-S— of the recurring units (R2*) differ from a recurring unit (R2) in that none of the optionally substituted groups Ar$^o$ is linked by each of its two ends to two sulfur atoms forming sulphide groups via a direct C—S linkage, at least one end of each arylene group Ar$^o$ being linked to D as above defined.

Non limitative examples of recurring units (R2*) include:

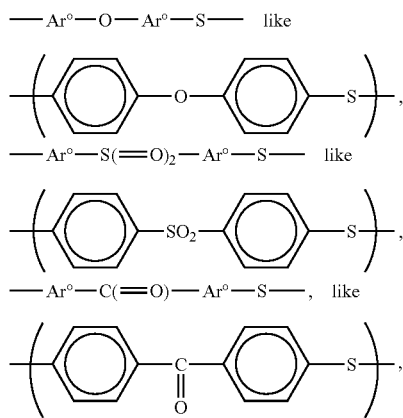

and mixtures thereof, wherein the diradical D is respectively an oxy, sulfonyl or carbonyl diradical.

Good results were obtained when the poly(arylene sulphide) was a poly(phenylene sulphide) homopolymer, i.e. a poly(phenylene sulphide) of essentially no, or even no, recurring unit other than recurring units (R2). Excellent results were obtained when the poly(arylene sulphide) was a poly(phenylene sulphide) homopolymer which contained essentially no, or even no, recurring unit other than unsubstituted p-phenylene recurring units.

Poly(arylene sulphide)s are commercially available from sources such as Chevron Phillips Chemical Company, Fortron Industries, and GE Plastics. Commercial grades of poly (arylene sulphide)s include PRIMEF®, RYTON®, FORTRON®, and SUPEC® poly(phenylene sulphide)s.

As above explained, the poly(arylene sulphide) (P2) may be in the form of a linear polymer or a branched polymer.

The Thermoplastic Polymer Material (P3)

The thermoplastic polymer material (P3) consists of (i) at least one poly(biphenyl ether sulfone) (P3a), and/or (ii) at least one poly(ether imide) (P3b), and/or at least one poly (ether imide sulfone) (P3c).

The material (P3) may consist of one and only one thermoplastic polymer. Alternatively, the material (P3) may be composed of several thermoplastic polymers.

Preferably, the material (P3) consists of (i) at least one poly(biphenyl ether sulfone) (P3a), and/or (ii) at least one poly(ether imide) (P3b). Accordingly, the material (P3) may notably consist of at least one poly(biphenyl ether sulfone) (P3a). It may notably also consist of least one poly(ether imide) (P3b).

More preferably, the material (P3) consists of at least one poly(biphenyl ether sulfone) (P3a) and at least one poly(ether imide) (P3b). The case being, the weight of the poly(ether imide) (P3b), based on the combined weight of the poly (biphenyl ether sulfone) (P3a) and the poly(ether imide) (P3b), ranges usually from 5% to 70%; it is preferably of at least 10% and more preferably of at least 15%, based on the combined weight of (P3a) and (P3b); on the other hand, it is preferably below 50%, more preferably below 35% and still more preferably of at most 25%, based on the combined weight of (P3a) and (P3b).

The poly(biphenyl ether sulfone) (P3a)

For the purpose of the invention, a poly(biphenyl ether sulfone) is intended to denote a polymer, in general a polycondensate, of which more than 50 wt. % of the recurring units are recurring units (R3a) of one or more formulae containing at least one p-biphenylene group:

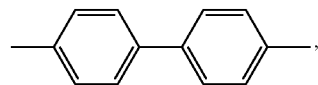

at least one ether group (—O—) and at least one sulfone group (—SO$_2$—).

In contrast with the recurring units (R3b) of the poly(ether imide) (P3b) and the recurring units (R3c) of the poly(ether imide sulfone) (P3c), the recurring units (R3a) of the poly (biphenyl ether sulfone) (P3a) are generally free of imide group, as such or in its amic acid form.

Preferably, recurring units (R3a) are recurring units of one or more formulae of the general type:

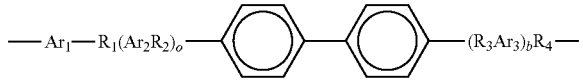

(1)

wherein R$_1$ through R$_4$ are —O—, —SO$_2$—, —S—, —CO—, with the proviso that at least one of R$_1$ through R$_4$ is —SO$_2$— and at least one of R$_1$ through R$_4$ is —O—; Ar$_1$, Ar$_2$ and Ar$_3$ are arylene groups containing 6 to 24 carbon atoms, and are preferably phenylene or p-biphenylene; and a and b are either 0 or 1.

More preferably, recurring units (R3a) are chosen from (2)

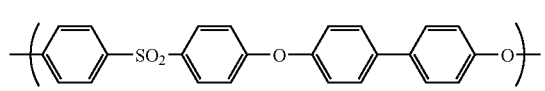

(3)

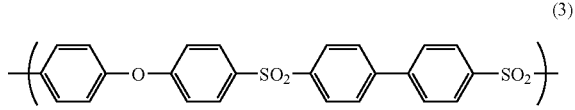

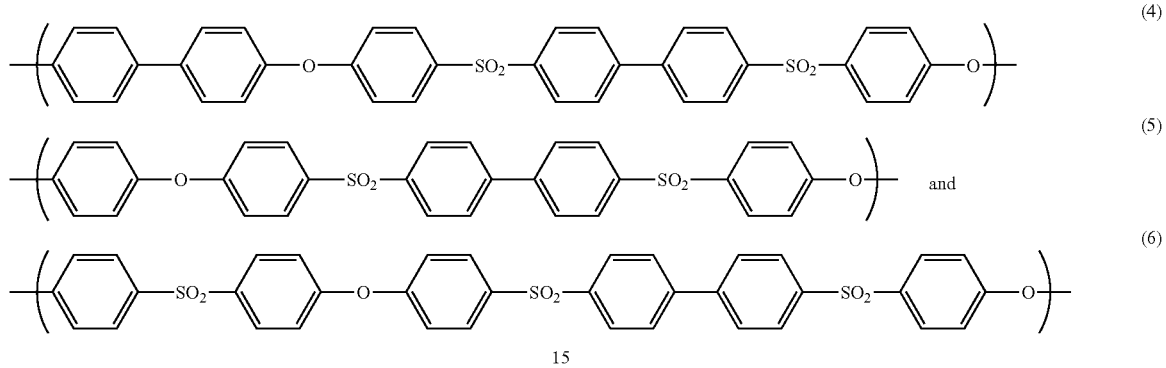

(4)

(5) and (6)

Still more preferably, recurring units (R3a) are either

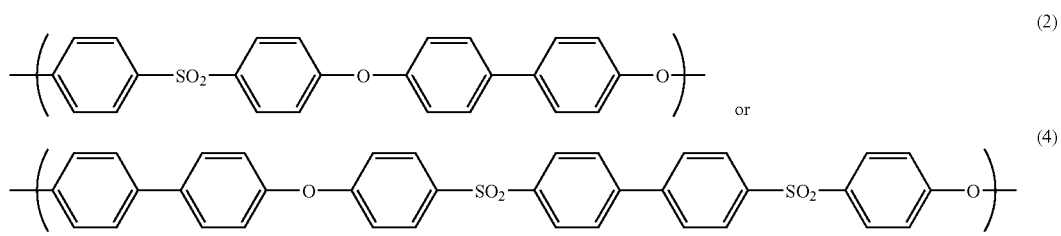

(2) or (4)

or a mix of

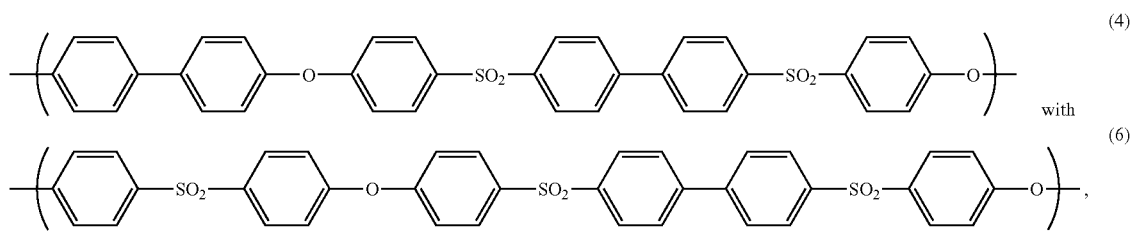

(4) with (6), wherein the weight amount of the recurring units (6) contained in the mix, based on the total amount of the recurring units (4) and (6) of which the mix consists, is between 10 and 99%, and preferably between 50 and 95%.

On one hand, using recurring units (2) as recurring units (R3a) provides in general the best overall cost-properties balance, and the highest level of toughness.

On the other hand, the use of recurring units (4) or of mixes of recurring units (4) and (6) as recurring units (R3a) results in a poly(biphenyl ether sulfone) (P3a) with an especially high glass transition temperature. Now, in certain particular applications like applications requiring protection from electrostatic discharge (ESD) useful notably in the semi-conductor industry, the use temperature is very high; recurring units (4) and mixes of recurring units (4) and (6), since they provide a poly(biphenyl ether sulfone) (P3a) with a glass transition temperature generally well above the use temperature, may be especially well suited notably for such applications. Besides, using a mix of recurring units (4) with recurring units (6) as recurring units (R3a) makes it often possible to achieve substantially the same level of properties as the one obtained when using recurring units (4) as sole recurring units (R3a), but at a somewhat more attractive cost.

The poly(biphenyl ether sulfone) (P3a) may be notably a homopolymer, a random, alternating or block copolymer.

When the poly(biphenyl ether sulfone) (P3a) is a copolymer, its recurring units may notably be composed of (i) recurring units (R3a) of at least two different formulae chosen from formulae (2) to (6), or (ii) recurring units (R3a) of one or more formulae (2) to (6) (especially, recurring units of formula (2)) and recurring units (R3a*), different from recurring units (R3a), such as:

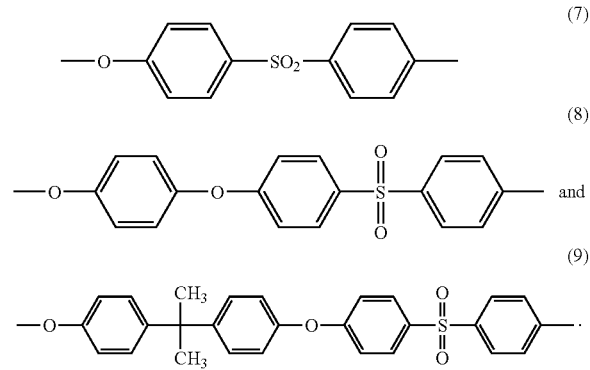

(7)

(8) and (9)

Preferably more than 70 wt. %, more preferably more than 85 wt. % of the recurring units of the poly(biphenyl ether sulfone) (P3a) are recurring units (R3a). Still more preferably, essentially all the recurring units of the poly(biphenyl ether sulfone) (P3a) are recurring units (R3a). The most preferably, all the recurring units of the poly(biphenyl ether sulfone) (P3a) are recurring units (R3a).

Good results were usually obtained when the poly(biphenyl ether sulfone) (P3a) was a polyphenylsulfone. Polyphenylsulfones are well known to the skilled person. Polyphenylsulfones are generally polycondensation polymers of which more than 50 wt. % of the recurring units are recurring units (R3a) of formula (2).

Excellent results were usually obtained when the poly(biphenyl ether sulfone) (P3a) was a polyphenylsulfone homopolymer, i.e. a polymer of which essentially all, if not all, the recurring units are of formula (2). RADEL® R polyphenylsulfone from Solvay Advanced Polymers, L.L.C. is an example of a polyphenylsulfone homopolymer.

The poly(ether imide) (P3b)

Poly(ether imide)s are form a class of engineering polymers well known to the skilled person. As any poly(ether imide), the poly(ether imide) (P3b) which can be included in the mixture (M) contains recurring units (R3b) comprising an ether group and an imide group; the imide group may be present as such and/or in its amic acid form. In contrast with the characteristic recurring units of polyamides and poly(amide imide)s, the characteristic recurring of poly(ether imide)s, and thus in particular the recurring units (R3b) of the poly(ether imide) (P3b), do not comprise any amide group which is not included in the amic acid form of an imide group. Also, in contrast with the characteristic recurring units of poly(ether sulfone imide)s, the characteristic recurring of poly(ether imide)s, and thus in particular the recurring units (R3b) of the poly(ether imide) (P3b), do not comprise any sulfone group.

The poly(ether imide) (P3b) is advantageously aromatic. Aromatic poly(ether imide)s contain recurring units comprising an arylene group.

Usually more than 5 wt. %, preferably more than 50 wt. % and more preferably more than 90 wt. % of the recurring units of the poly(ether imide) (P3b) are recurring units (R3b) as above described. Still more preferably, the poly(ether imide) (P3b) is a homopolymer, i.e. essentially all, if not all, the recurring units of the poly(ether imide) (P3b) are recurring units (R3b).

Preferably, the recurring units (R3b) are of one or more formulae comprising at least one arylene group, at least one ether group and at least one imide group, as such and/or in its amic acid form, said one or more formulae being free of any sulfone group and of any amide group which is not included in the amic acid form of an imide group.

A certain class of aromatic poly(ether imide)s (P3b) consists of those wherein the recurring units (R3b) are of

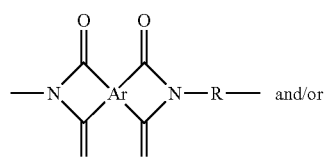

formula (10)

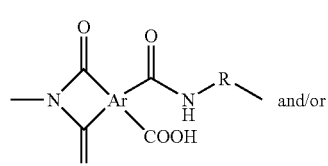

formula (11)

and/or

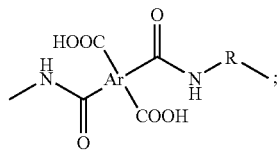

formula (12)

where:

Ar is:

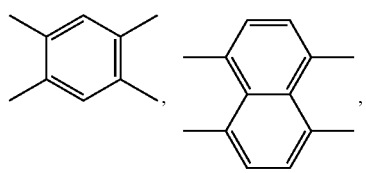

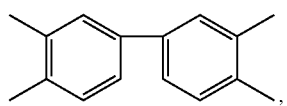

with X=

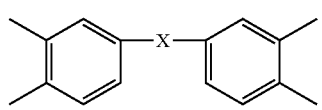

with n=1, 2, 3, 4 or 5;

R is:

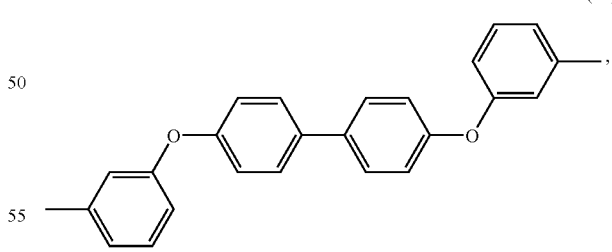

(13)

(14)

Examples of poly(ether imide)s (P3b) belonging to this class of aromatic polyetherimides are those wherein the recurring units (R3b) are of formula:

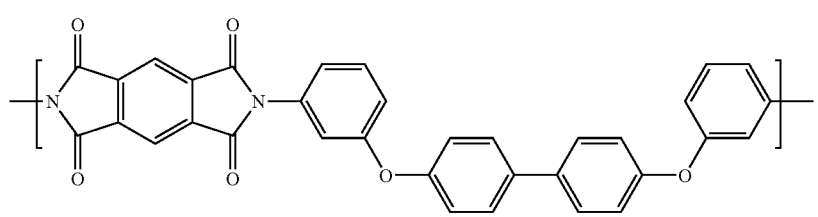

and/or its two corresponding amic acid forms [see formulae (11) and (12) versus the wholly imide form of formula (10)].

A certain other class of aromatic poly(ether imide)s (P3b) consists of those wherein the recurring units (R3b) are of one or more formulae of the general structure:

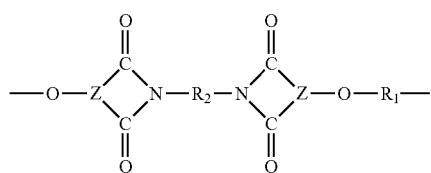

wherein the imide groups of formula (16) are contained in the aromatic poly(ether imide) (P3b) as such and/or in their amic acid forms, and (i) —O—Z is a member selected from (i-a)

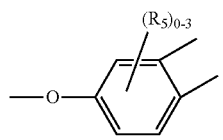

wherein $R_5$ is independently hydrogen or $C_1$-$C_6$ alkyl or $C_1$-$C_6$ alkoxy;

(i-b)

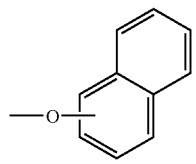

wherein the oxygen may be attached to either ring and located ortho or para to one of the bonds of the imide carbonyl groups, and (i-c)

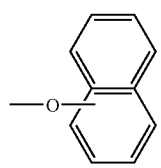

wherein the oxygen may also be attached to either ring and located ortho or para to one of the bonds of the imide carbonyl groups (ii) $R_1$ is selected from (ii-a) substituted or unsubstituted aromatic radicals such as

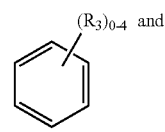

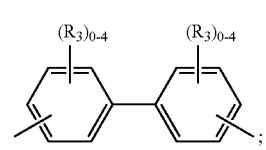

(ii-b) divalent radicals of the formula:

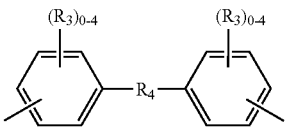

wherein $R_3$ is independently $C_1$ to $C_6$ alkyl or aryl and $R_4$ is selected from —O—, alkylenes of 1 to 6 carbon atoms and cycloalkylenes of 4 to 8 carbon atoms;

(iii) $R_2$ is selected from aromatic hydrocarbon radicals having from 6 to 20 carbon atoms and alkyl substituted derivatives thereof wherein the alkyl group contains 1 to 6 carbon atoms, alkylene and cycloalkylene radicals having from 2 to 20 carbon atoms, $C_2$ to $C_8$ alkylene terminated polydiorganosiloxanes, and divalent radicals of the formula (22) wherein $R_3$ and $R_4$ are as previously defined.

Poly(ether imide)s having recurring units (R3b) of the general formula (16) can be prepared by methods well known in the art as set forth in, for example, U.S. Pat. Nos. 3,833,544, 3,887,588, 4,017,511, 3,965,125 and 4,024,110. Methods well-known to those skilled in the art including the reaction of an aromatic bis(ether anhydride)s with an aromatic diamino compound of formula $H_2N$—Ar—$NH_2$ wherein Ar is an arylene group; in general, the reactions are carried out employing well-known solvents, e.g., o-dichlorobenzene, m-cresol/toluene, N,N-dimethylacetamide, etc., in which to effect interaction between the dianhydrides and diamines, at temperatures of from about 20° C. to about 250° C. Alternatively, these poly(ether imide)s can be prepared by melt polymerization of a dianhydride with a diamino compound, while heating the mixture of the ingredients at elevated temperatures with concurrent intermixing. Aromatic bis(ether anhydride)s suitable for the preparation of poly(ether imide)s having recurring units (R3b) of the general structure (16) can be notably chosen from:

2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
1,4-bis(2,3-dicarboxyphenoxy)benzene dianhydride;
2,2-bis[4-(3,4-dicarboxyphenoxy)phenyl]propane dianhydride;
4,4'-bis(3,4-dicarboxyphenoxy)diphenyl ether dianhydride;
1,3-bis(3,4-dicarboxyphenoxy)benzene dianhydride;
1,4-bis(3,4-dicarboxyphenoxy)benzene dianhydride;
and mixtures of such dianhydrides. The most preferred aromatic bis(ether anhydride) is bisphenol A dianhydride. Aromatic diamino compounds suitable for the preparation of poly(ether imide)s having recurring units (R3b) of the general structure (16) include, for example, m-phenylenediamine, p-phenylenediamine, 2,2-bis(p-aminophenyl)propane, 4,4'-diaminodiphenyl-methane and 4,4'-diaminodiphenyl ether. The most preferred diamine is m-phenylenediamine.

Very preferably, the recurring units (R3b) are of one or more formulae

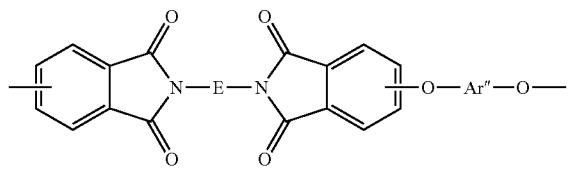

(23)

as such, and/or in their amic acid forms

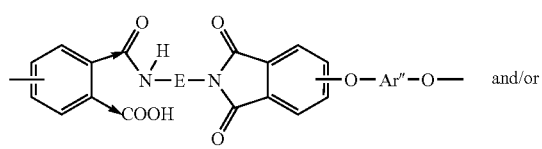

(24)

and/or

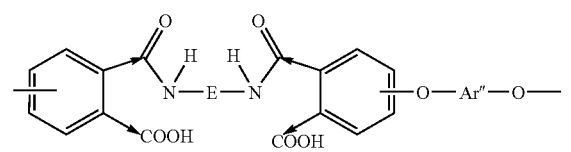

(25)

wherein:
the → denotes isomerism so that in any recurring unit the groups to which the arrows point may exist as shown or in an interchanged position;
E is chosen from:

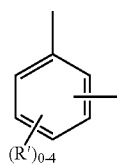

(E-i)

with the R' being, independently from each other, alkyl radicals comprising from 1 to 6 carbon atoms or $C_6$-$C_{10}$ aryls;

(E-ii)

with n=integer from 1 to 6;

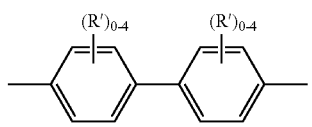

(E-iii)

with the R' being, independently from each other, alkyl radicals comprising from 1 to 6 carbon atoms, or $C_6$-$C_{10}$ aryls;

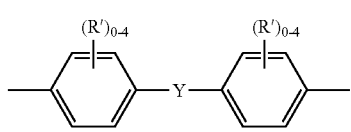

(E-iv)

with the R' being, independently from each other, alkyl radicals comprising from 1 to 6 carbon atoms, or $C_6$-$C_{10}$ aryls;

and Y being chosen from:

(Y-i) alkylenes of 1 to 6 carbon atoms, in particular

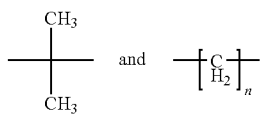

with n=integer from 1 to 6, (Y-ii) cycloalkylenes of 4 to 8 carbon atoms, and

(Y-iii)

Ar" is selected from:

(Ar"-i) aromatic hydrocarbon radicals having from 6 to 20 carbon atoms and alkyl substituted derivatives thereof wherein the alkyl substituting group contains 1 to 6 carbon atoms, such as:

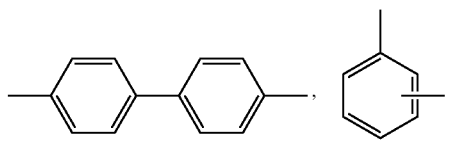

and alkyl substituted derivatives thereof wherein the alkyl substituting group contains from 1 to 6 carbon atoms;

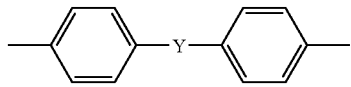

(Ar"-ii)

with Y being chosen from (Y-i), (Y-ii) and (Y-iii) as above defined,
(Ar"-iii) alkylene and cycloalkylene radicals having from 2 to 20 carbon atoms, and
(Ar"-iv) $C_2$ to $C_8$ alkylene terminated polydiorganosiloxanes.

In the recurring units (R3b) of formula (23), Ar" is preferably chosen from with the R' being, independently from each other, alkyl radicals comprising from 1 to 6 carbon atoms or $C_6$-$C_{10}$ aryls; more preferably, E is unsubstituted m-phenylene or p-phenylene.

Good results were obtained when the recurring units (R3b) were recurring units of formula (28) as such, in imide form, and/or in amic acid forms [formulae (29) and (30)]:

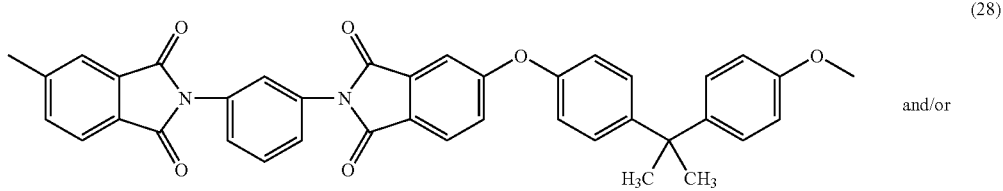

and/or (28)

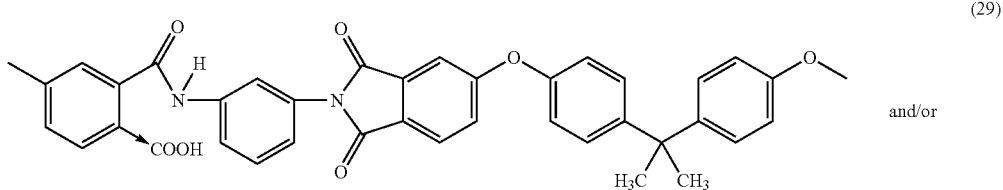

and/or (29)

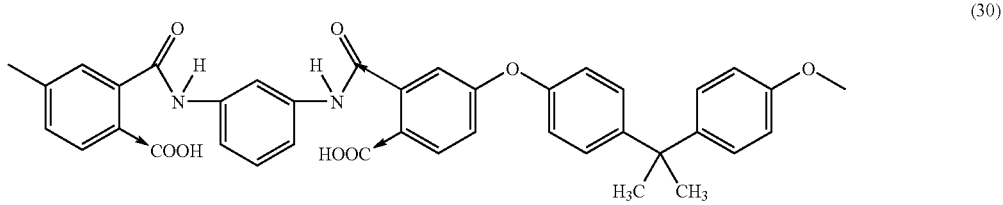

(30)

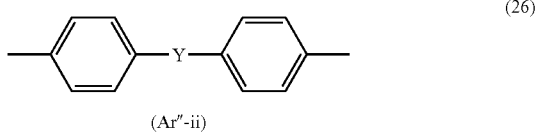

(26)

(Ar"-ii)

with Y being chosen from (Y-i), (Y-ii) and (Y-iii), as above defined.
More preferably, Ar" is

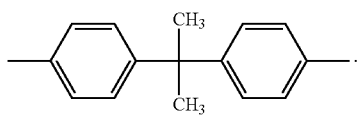

(27)

Besides, in the recurring units (R3b) of formula (23), E is preferably

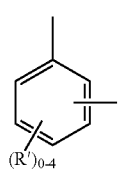

wherein in formulae (29) and (30) the → denotes isomerism so that in any recurring unit the groups to which the arrows point may exist as shown or in an interchanged position.

Aromatic poly(ether imide)s homopolymers, of which essentially all, if not all, the recurring units are of formula (28), and/or their two corresponding amic acid forms, are commercially available from SABIC INNOVATIVE PLASTICS as ULTEM® 1000 poly(ether imide)s. More generally, SABIC INNOVATIVE PLASTICS commercializes a broad range of aromatic poly(ether imide)s comprising recurring units of the general formula (16), and/or their two corresponding amic acid forms.

The poly(ether imide sulfone) (P3c)

The poly(ether imide sulfone) (P3c) is a polymer of which at least 5 wt. % of the recurring units are recurring units (R3c) comprising an ether group, an imide group as such and/or in its amic acid form, and a sulfone group. The recurring units (R3c) of the poly(ether imide sulfone) (P3c) are advantageously free of any amide group which is not included in the amic acid form of an imide group. The poly(ether imide sulfone) (P3c) is advantageously aromatic, i.e. it contains recurring units comprising an arylene group.

The recurring units (R3c) are preferably recurring units of formula (31), (32) and/or (33), as represented below:

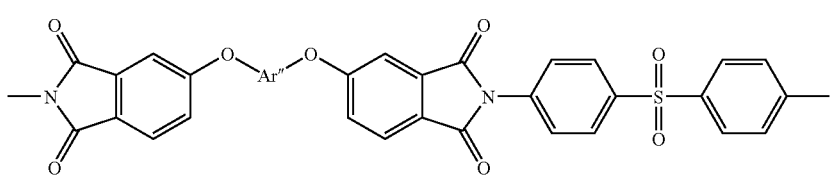

(31)

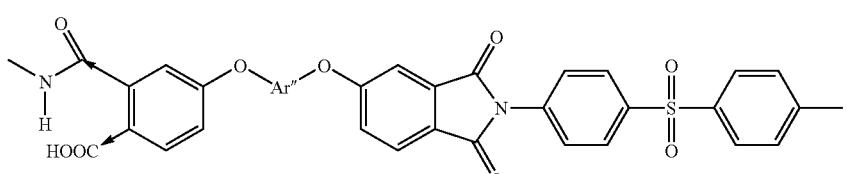

(32)

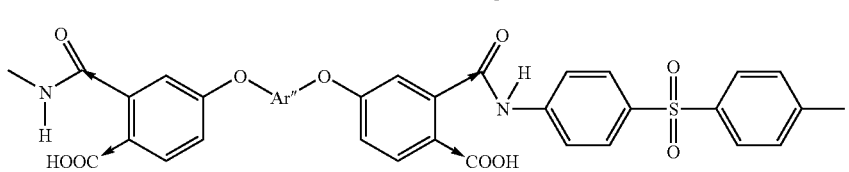

(33)

wherein:
(32) and (33) are the amic acid forms corresponding to the imide form (31);
the → denotes isomerism so that in any recurring unit the groups to which the arrows point may exist as shown or in an interchanged position;
Ar" in formulae (31) to (33) is chosen among the following structures:

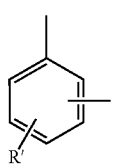

with the linking groups being in ortho, meta or para position and R' being a hydrogen atom or an alkyl radical comprising from 1 to 6 carbon atoms,

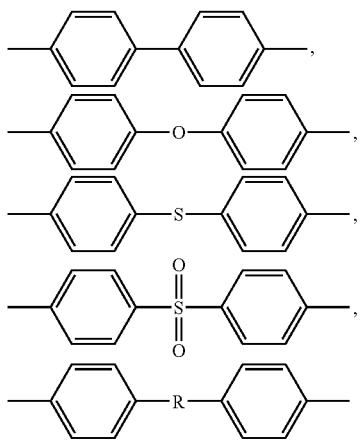

with R being an aliphatic divalent group of up to 6 carbon atoms, such as methylene, ethylene, isopropylene and the like, and mixtures thereof.

Preferably more than 50 wt. %, and more preferably more than 90 wt. % of the recurring units of the poly(ether imide sulfone) (P3c) are recurring units (R3c) as above described; still more preferably, all the recurring units of the poly(ether imide sulfone) (P3c) are recurring units (R3c).

The poly(ether imide sulfone)s (P3c) having recurring units (R3c) of the general formula (31) can be prepared by the same methods as the methods suitable for preparing the poly (ether imide)s (P3b) having recurring units (R3b) of the general formula (16), as above described, except that the aromatic bis(ether anhydride)s is reacted with a particular aromatic diamine containing a sulfone group, namely 4,4'-diaminodiphenyl sulfone.

Poly(ether imide sulfone)s (P3c) are commercially available from SABIC INNOVATIVE PLASTICS as EXTEM® poly(ether imide sulfone)s.

Optional Ingredients

In a certain preferred embodiment of the present invention, the mixture (M) may be composed essentially of, or even be composed of, the poly(aryl ether ketone) (P1), the poly (arylene sulfide) (P2) and the polymer material (M3).

Alternatively, the mixture (M) may further include one or more ingredients other than the poly(aryl ether ketone) (P1), the poly(arylene sulfide) (P2) and the polymer material (P3) [hereinafter, "the optional ingredient(s)"]. Desirably, the optional ingredient(s) do no detrimentally affect the beneficial properties of the mixture (M), in particular the tensile modulus, the tensile elongation at break, the notched Izod, the heat deflection temperature and/or the environmental stress cracking resistance, in comparison to a mixture that is free of any optional ingredient. If optional ingredient(s) are contained in the mixture (M), their weight, based on the total weight of the mixture (M), generally does not exceed 50 wt. %; it is preferably of at most 40 wt. % and more preferably of at most 35 wt. %.

In particular:
the mixture (M) may include a thermoplastic polymer other than the poly(aryl ether ketone) (P1), the poly (arylene sulfide) (P2) and the polymer material (M3), such as: acrylonitrile-butadiene-styrene, allyl resin, cellulosic resins, ethylenevinyl alcohol, polyacetal, polyacrylates, polyacrylonitrile, polyamide such as polyphthalamide, polyamide-imide, polybutadiene, polybutylene, polyolefin, polycarbonate, polydicyclopentadiene, polyester, polyethylene, polyimide, polyphenyleneoxide, polystyrene, bisphenol A polysulfone (also known just as "polysulfone"), polyethersulfone, polyurethane, polyvinylchloride, silicone and mixtures thereof.

the mixture (M) may also include one or more additives selected from the group consisting of thermal stabilizers, processing aids, flame retardants, colorants, nucleating agents and impact modifiers, and mixtures thereof.

In another preferred embodiment of the present invention, the mixture (M) includes at least one friction reducing additive. For the purpose of the present invention, a "friction reducing additive" is intended to denote a compound that, when included in the mixture (M), decreases the coefficient of friction of said mixture (M), when compared to the same mixture but not including the friction reducing additive. Thus, the friction reducing additive causes the resultant mixture (M) and articles comprising said resultant mixture (M) to have a more slippery or silky or slick feel, with reduced friction between the resultant mixture (M) and materials that come into contact therewith.

The weight of the friction reducing additive, based on the total weight of the mixture (M), ranges preferably from 15% to 45%, more preferably from 20% to 40% and still more preferably from 25% to 35%.

The friction reducing additive may be a particulate solid type friction reducing additive, which can be of either microscopic or nano-scale dimensions (i.e. where average particle has at least one dimension with a length of under 200 nm.). The term "particulate solid" is herein intended to denote a solid having a non fibrous morphology (e.g. sphere, flake, rod, pellet, coarse powder, micro-powder, etc.) or a particulate solid that is obtained by comminuting (i.e. reducing to very small particles by, for example, milling, grinding, pounding or abrading) a fibrous material.

Alternatively, the friction reducing additive may be fibrous. "Fibers" or "fibrous materials" as used herein, mean a fundamental form of solid (often crystalline) characterized by relatively high tenacity and an extremely high ratio of length to diameter. The fibers may be continuous, discontinuous, milled, chopped, and combinations thereof.

The mixture (M) may include at least one friction reducing additive chosen from lubricants; non limitative examples of lubricants suitable for being incorporated in the mixture (M) are molybdenum disulfide, silicone oils, melt processible fluoropolymers such as copolymers of tetrafluoroethylene with a perfluoroalkylvinylether, boron nitride, and mixtures thereof.

The mixture (M) may include at least one friction reducing additive chosen from reinforcing agents; non limitative examples of reinforcing agents suitable for being incorporated in the mixture (M) are carbon fibers including pitch-based, PAN-based and vapor grown carbon fibers, glass fibers, aramid fibers, PBI fibers, PBO fibers and mixtures thereof.

The mixture (M) may include at least one friction reducing additive chosen from fillers, like aramide powder, titanium carbide and mixtures thereof.

The mixture (M) may include at least one friction reducing nanoadditive; non limitative examples of friction reducing nanoadditives suitable for being incorporated in the mixture (M) are carbon nanofibers, carbon nanotubes, carbon nanohorns, silica, barium sulfate, and mixtures thereof.

A first particularly preferred ingredient making the mixture (M) especially useful notably for use in friction and wear resistant applications is carbon fiber. Carbon fiber useful for the present invention can advantageously be obtained by heat treatment and pyrolysis of different polymer precursors such as, for example, rayon, polyacrylonitrile (PAN), aromatic polyamide or phenolic resin; carbon fiber useful for the present invention may also be obtained from pitchy materials. The term "graphite fiber" intends to denote a carbon fiber that has been obtained by high temperature pyrolysis (over 2000° C.) the carbon fiber, wherein the carbon atoms place in a way similar to the graphite structure. The carbon fiber is preferably a PAN-based carbon fiber; an example of such a carbon fiber is FORTAFIL® 219 carbon fiber.

A second particularly preferred ingredient making the mixture (M) especially useful notably for use in friction and wear resistant applications is graphite.

A third particularly preferred ingredient making the mixture (M) especially useful notably for use in friction and wear resistant applications is polytetrafluoroethylene.

Good results were obtained in friction-and-wear resistant applications when the mixture (M) further included carbon fiber, and at least one of graphite and polytetrafluoroethylene, wherein:
  the combined weight amount of carbon fiber, graphite and polytetrafluoroethylene, based on the total weight of the mixture (M), ranges preferably from 15% to 45%; and
  the weight amount of carbon fiber, based on the total weight of the mixture (M), ranges preferably from 5% to 25%.

Excellent results were obtained in friction-and-wear resistant applications when the mixture (M) further included carbon fiber, graphite and polytetrafluoroethylene, wherein:
  the combined weight amount of carbon fiber, graphite and polytetrafluoroethylene, based on the total weight of the mixture (M), ranges preferably from 15% to 45%, more preferably from 20% to 40% and still more preferably from 25% to 35%;
  the weight amount of carbon fiber, based on the total weight of the mixture (M), ranges preferably from 5% to 15% and more preferably from 7.5% to 12.5%;
  the weight amount of graphite, based on the total weight of the mixture (M), ranges preferably from 5% to 15% and more preferably from 7.5% to 12.5%; and
  the weight amount of polytetrafluoroethylene, based on the total weight of the mixture (M), ranges preferably from 5% to 15% and more preferably from 7.5% to 12.5%.

Another aspect of the present invention concerns a process for preparing the mixture (M) as above described, which comprises melt compounding the poly(aryl ether ketone) (P1), the poly(arylene sulfide) (P2) and the thermoplastic polymer material (P3).

Preferably, the invented process comprises:
  dry blending the poly(aryl ether ketone) (P1), the poly(arylene sulfide) (P2) and the thermoplastic polymer material (P3), so as to obtain a dry blend, then
  melt compounding the dry blend.

The melt compounding step takes preferably place in an extruder, and more preferably vacuum venting is applied at a barrel of the extruder during compounding to strip off moisture and any other possible residual volatiles from the mixture (M).

Still another aspect of the present invention concerns an article comprising the mixture (M) as above described. The article may consist essentially of, or even consist of, the mixture (M) as above described. The article may also comprise one part consisting essentially of, or even consisting of, the mixture (M) as above described. In a certain preferred embodiment of the present invention, the article comprises at least one part having a bearing surface, said part being composed of the mixture (M), wherein the mixture (M) further comprises at least one friction reducing additive, as above described.

The article in accordance with the present invention may be:
- an injection molded article;
- an extruded article, such as a film, fiber, sheet stock, rod stock, tubing or profile;
- a compression molded article;
- a valve component or a related part thereof such as a seal ring;
- a compressor or a pump component, such as a plate valve, a ring valve, a poppet for suction and discharge components on air compressor, a refrigeration compressor, a reciprocating compressor (including e.g. LPG, ammonia, chlorine, HCl, ethylene or propylene);
- a sealing component, such as gasket or a back up ring, especially for use in a downhole environment of oil/gas production;
- an electronic component, especially an electronic component of a surface mount type circuit assembly for its ability to withstand IR reflow solder temperatures;
- a hard drive platter component, or a head component;
- a component useful in semi-conductor manufacturing, such as a cell cassette or a chip carrier tray; such a component is typically electro-statically dissipative (ESD) through the addition of carbon fibers, carbon nano-tubes or some other conductive additives;
- a component of a semi-conductor test equipment, such as a test socket or a burn-in sockets;
- a fitting and/or coupling of a fluid delivery system, especially a fluid delivery system used in the chemical process industry or other industries where hot harsh chemicals and/or steam are present;
- a matrix for structural continuous fiber composites;
- a cookware or bakeware, suitable for use in both a microwave as well as a conventional oven;
- a downhole abrasion tape or a flexible riser abrasion tape;
- an under-the-hood automotive component, that may be exposed to high heat;
- an article useful in lighting applications, such as a lighting socket, a LED frame or a LED housing;
- a thermally dissipative heat sink, useful notably in computers; then, the mixture (M) typically incorporates at least one thermally conductive filler such as pitch-based carbon fiber;
- an aerospace electrical or electronic connector component or housing;
- a friction and wear component such as a bushing, a bearing or a thrust washer,
- a gear;
- a mechanical drive component;
- an electrical or electronic, wire or cable insulation or coating;
- a bushing, bearing or another frictional component of an elevator door component, or other sliding mechanism; or
- a bushing, bearing or another frictional component of a high temperature conveyor system.

The article in accordance with the present invention may be also be useful in automotive, transportation and heavy duty equipment end uses; with respect thereof, the article in accordance with the present invention may be also be:
- a plate for turbo components and/or air induction;
- an hydraulic component, a seal, a poppet or a piston ring of an agricultural or construction equipment;
- an anti-wear layer of a push-pull cable;
- a glide ring, a tappet, a gear, an electronically driven pad, a control valve, a pump component, a bushing or a check ball of a brake system;
- a seal ring, a thrust washer, or a ball of a transmission component;
- a gear, a bushing or a bearing of a steering system component;
- a ramp button, a torque roller, a thrust button of a CVT (Continuous Variable transmissions) or clutch.
- a pump component, a gear, or a sensor of an emission system;
- a pump or a G-rotor of an oil system;
- a swash plate of a compressor;
- an air bag sensor;
- a friction plate, a door sleeve or a bracket or another sliding component of a train door;
- an automotive chassis component; or
- a motor thrust washer or film for seat adjustment mechanisms.

Still another aspect of the present invention concerns a process for preparing the article as above described, which comprises melting the mixture (M) so as to get a molten mixture, shaping the molten mixture to the article, and cooling the article.

Preferably, said process comprises molding the mixture (M). More preferably, said process comprises injection molding the mixture (M).

Also preferably, after the article is cooled, e.g. after the injection molded article is cooled, it is not annealed by subsequent exposure to heat. Thus, the article is preferably used "as shaped and cooled".

Still another aspect of the present invention concerns the use of a thermoplastic polymer material (P3) consisting of (i) at least one poly(biphenyl ether sulfone) (P3a), and/or (ii) at least one poly(ether imide) (P3b), and/or at least one poly (ether imide sulfone) (P3c), for improving the toughness-related properties of a thermoplastic polymer mixture comprising at least one poly(aryl ether ketone) (P1) and at least one poly(arylene sulfide) (P2), wherein (P1), (P2), (P3), (P3a), (P3b) and (P3c) are as previously described. In particular, the invention concerns the use of a thermoplastic polymer material (P3) consisting of (i) at least one poly(biphenyl ether sulfone) (P3a), and/or (ii) at least one poly(ether imide) (P3b), and/or at least one poly(ether imide sulfone) (P3c), for increasing the notched Izod and/or the tensile yield elongation and/or the tensile elongation at break of a thermoplastic polymer mixture comprising at least one poly(aryl ether ketone) (P1) and at least one poly(arylene sulfide) (P2). The notched Izod is generally measured in accordance with ASTM D-256, while the tensile yield elongation and the tensile elongation at break are generally measured in accordance with ASTM D-638.

A last aspect of the present invention concerns the use of a thermoplastic polymer material (P3) consisting of (i) at least one poly(biphenyl ether sulfone) (P3a), and/or (ii) at least one poly(ether imide) (P3b), and/or at least one poly(ether imide sulfone) (P3c), for increasing the heat deflection temperature of a thermoplastic polymer mixture comprising at least one poly(aryl ether ketone) (P1) and at least one poly(arylene sulfide) (P2). The heat deflection temperature is generally measured in accordance with ASTM D-648.

EXAMPLES

Fourteen formulations were prepared, representing various mixtures in accordance with the present invention and controls. They illustrated the practice of this invention and demonstrated the unexpected benefits and utility of the presently invented mixtures.

The exact formulations and raw materials used are shown in Tables 1 and 2. The effect of polyphenylsulfone (PPSU) and/or poly(ether imide) (PEI) addition to a poly(ether ether ketone) (PEEK)/poly(phenylene sulfide) (PPS) mixture was evaluated for each of the mixtures in a side by side fashion with the PEEK control and the unmodified PEEK/PPS control. For the sake of simplicity and illustration, the PEEK/PPS ratio was kept at 2:1 throughout this work.

Formulations E1, E2, E3, E4, E5, E6, E7, E8 and E9 were in accordance with the present invention.

Formulations CE1, CE2, CE3, CE4 and CE5 were prepared for comparison.

Polymer Materials Used

The PEEK grade used in these examples was KetaSpire® KT-850P PEEK, a medium viscosity grade of PEEK with a melt viscosity range of 3500 to 4100 poise as measured by a capillary rheometer at a temperature of 400° C. and a shear rate of $1000\ s^{-1}$.

The PPS grade used was DSP LD-10G, a linear high molecular weight grade of PPS from Dainippon Ink and Chemicals.

The PPSU grades used were RADEL® R-5000 NT and RADEL® R-5100 NT PPSU. These grades are the standard injection molding natural grades of PPSU, with medium viscosity characterized by a melt flow rate range of 14 to 20 g/10 min measured at a temperature of 365° C. and 5.0 kg weight.

The PEI used was ULTEM® 1000 PEI, the standard injection molding grade of poly(ether imide) natural resin available from Sabic Innovative Plastics. This polymer is the polycondensation product of bisphenol A dianhydride with meta-phenylenediamine.

Preparation of Formulations

All polymer mixtures of this invention were prepared by first tumble blending the resins to be blended for about 20 minutes, followed by melt compounding using an 18 mm Leistritz corotating intermeshing twin screw extruder. The extruder had 6 barrel zones with barrels 2 through 6 being heated (corresponding to zones 1 through 5, respectively in Tables 4 and 5). Vacuum venting was applied at barrel 5 during compounding to strip off moisture and any possible residual volatiles from the compound.

Testing of Formulations

Mechanical properties were tested for all formulations using 0.125 inch thick ASTM test specimens using the following ASTM methods and 0.125 in thick injection molded specimens:

D-638: Tensile properties
D-790: Flexural properties
D-256: Izod impact resistance (notched)
D-4812: Izod impact resistance (no notch)
D-648: Heat deflection temperature at an applied stress of 264 psi In addition to mechanical property measurements, environmental stress cracking resistance (ESCR) was also assessed for some of the formulations using parabolic flexural jigs with continuously varying outer fiber strain from 0 to 2.0%. Flexural jigs with ASTM flexural specimens mounted were immersed in three solvents: chloroform, methyl ethyl ketone and toluene. The minimum strain required to induce failure (e.g. crazing or cracking) was recorded.

Observations

Certain key observations were that:
PPSU and/or PEI addition to the PEEK/PPS mixture improved the following properties over the otherwise unmodified PEEK/PPS mixture:
higher tensile yield elongation
higher tensile elongation at break
higher notched impact resistance
higher heat deflection temperature;
essentially, one could achieve properties that were generally more similar to those of unmodified PEEK while substantially reducing the cost of the formulation relative to PEEK.
all the formulations according to this invention showed outstanding ESCR with resistance to any crazing or cracking up to the maximum applied strain of 2.0%; this performance was much better than that known for PEEK in these media, so the formulations of this invention performed much better than would be expected based on averaging the ESCR performance of the individual components of the invented mixtures.

TABLE 1

Formulations and mechanical properties for PEEK/PPS mixtures with and without additional thermoplastic polymer material

| | Formulation No. | | | | | | |
|---|---|---|---|---|---|---|---|
| | CE1 | CE2 | E1 | CE3 | E2 | E3 | CE4 |
| PEEK, KetaSpire ® KT-850P | 100.0 | 66.7 | 60.0 | 60.0 | 60.0 | 60.0 | — |
| PPS, DIC Grade DSP LD-10G | — | 33.3 | 30.0 | 30.0 | 30.0 | 30.0 | 100.0 |
| PPSU, Radel ® R-5100 NT | — | — | 10.0 | — | — | 8.0 | — |
| PES, Radel ® A-301 NT | — | — | — | 10.0 | — | — | — |
| PEI, Ultem ® 1000 | — | — | — | — | 10.0 | 2.0 | — |
| As-Molded Tensile Properties | | | | | | | |
| Tensile Strength at Yield (psi) | 13700 | 13300 | 12700 | 13000 | 11900 | 12000 | 12400 |
| Tensile Modulus (Ksi) | 528 | 555 | 520 | 525 | 496 | 482 | 559 |
| Tensile Yield Elongation (%) | 5.0 ± .16 | 4.5 ± .18 | 4.9 ± .06 | 4.8 ± .05 | 4.8 ± .07 | 4.8 ± .08 | 3.5 ± .04 |
| Tensile Elongation at Break (%) | 23 ± 6 | 15 ± 1 | 25 ± 3 | 18 ± 3 | 61 ± 20 | 68 ± 9 | 14 ± 2 |
| Annealed Tensile Properties | | | | | | | |
| Tensile Strength at Yield (psi) | 14000 | 13800 | 13400 | 13800 | 14300 | 13700 | 13300 |
| Tensile Modulus (Ksi) | 549 | 583 | 536 | 563 | 583 | 523 | 567 |
| Tensile Yield Elongation (%) | 5.3 ± .11 | 5.0 ± .09 | 5.5 ± .08 | 5.5 ± .09 | 5.8 ± .06 | 5.5 ± .06 | 3.6 ± .07 |
| Tensile Elongation at Break (%) | 20 ± 5 | 17 ± 2 | 19 ± 2 | 15 ± 2 | 17 ± 2 | 18 ± 1 | 6.9 ± 4 |
| Flex and Impact - As Molded | | | | | | | |
| Flex Strength (psi) | 21500 | 21600 | 20000 | 20900 | 17600 | 18100 | 20900 |
| Flex Modulus (Ksi) | 538 | 571 | 523 | 553 | 455 | 471 | 561 |
| Notched Izod | 1.45 ± .11 | 1.16 ± .04 | 1.49 ± .06 | 1.15 ± .05 | 1.52 ± .06 | 1.47 ± .07 | 0.60 ± .04 |

TABLE 1-continued

Formulations and mechanical properties for PEEK/PPS mixtures with and without additional thermoplastic polymer material

| | Formulation No. | | | | | | |
|---|---|---|---|---|---|---|---|
| | CE1 | CE2 | E1 | CE3 | E2 | E3 | CE4 |
| No Notch Izod | 100% NB | 100% NB | 100% NB | 100% NB | 100% NB | 100% NB | 80% NB |
| HDT [Annealed] (° C.) | 156.7 | 155.0 | 158.0 | 157.4 | 164.5 | 163.2 | 120.3 |

Notes:
NB = No breaks. Number shown indicates percentage of specimens tested that exhibited no break
Annealing conditions: 200° C. for 2 hours
Numbers after ± are standard deviations
Where no standard deviation is shown, the standard deviation was <3% of the average value

TABLE 2

Formulations and Properties of Various Ternary PEEK/PPS/PPSU mixtures

| | Formulation No. | | | | | |
|---|---|---|---|---|---|---|
| | E4 | E5 | E6 | E7 | E8 | E9 |
| PEEK, KetaSpire ® KT-850P | 60.0 | 60.0 | 60.0 | 55.0 | 50.0 | 50.0 |
| PPS, DIC Grade DSP LD-10G | 30.0 | 30.0 | 30.0 | 30.0 | 30.0 | 25.0 |
| PPSU, Radel ® R-5000 NT | 10.0 | 10.0 | 10.0 | 15.0 | 20.0 | 25.0 |
| $TiO_2$, DuPont Tipure ™ R-105 | — | 2.00 phr | — | — | — | — |
| Zinc sulfide, Sachtolith ™ L | — | — | 2.00 phr | — | — | — |
| As-Molded Tensile Properties | | | | | | |
| Tensile Strength at Yield (psi) | 12600 | 12500 | 12600 | 12400 | 12300 | 12000 |
| Tensile Modulus (Ksi) | 498 | 502 | 506 | 475 | 479 | 445 |
| Tensile Yield Elongation (%) | 4.8 ± .03 | 4.8 ± .12 | 4.8 ± .03 | 5.0 ± .09 | 5.2 ± .08 | 5.3 ± .09 |
| Tensile Elongation at Break (%) | 81 ± 2 | 53 ± 22 | 64 ± 9 | 78 ± 2 | 70 ± 8 | 68 ± 9 |
| Annealed Tensile Properties | | | | | | |
| Tensile Strength at Yield (psi) | 13700 | 13800 | 13800 | 13700 | 13500 | 13500 |
| Tensile Modulus (Ksi) | 561 | 548 | 546 | 523 | 506 | 489 |
| Tensile Yield Elongation (%) | 5.4 ± .05 | 5.4 ± .17 | 5.4 ± .18 | 5.6 ± .10 | 5.8 ± .16 | 6.0 ± .11 |
| Tensile Elongation at Break (%) | 19 ± 1 | 19 ± 5 | 18 ± 5 | 20 ± 2 | 20 ± 3 | 18 ± 2 |
| Flex and Impact - As Molded | | | | | | |
| Flex Strength (psi) | 19300 | 18800 | 18800 | 18800 | 18500 | 17500 |
| Flex Modulus (Ksi) | 502 | 493 | 494 | 487 | 479 | 450 |
| Notched Izod | 1.24 ± .04 | 1.55 ± .03 | 1.56 ± .03 | 1.32 ± .06 | 1.45 ± .04 | 1.52 ± .02 |
| No Notch Izod | NB | NB | NB | NB | NB | NB |
| HDT [Annealed] (° C.) | 160.9 | 163.0 | 160.5 | 162.8 | 164.4 | 164.2 |

Notes:
NB = No breaks on any of specimens tested
Annealing conditions: 200° C. for 2 hours
Numbers after ± are standard deviations
Where no standard deviation is shown, the standard deviation was <3% of the average value

TABLE 3

Environmental Stress Cracking Resistance (ESCR) (Critical Strain, %) of Various Ternary PEEK/PPS/PPSU Mixtures

| | Formulation No. | | | | | | | | |
|---|---|---|---|---|---|---|---|---|---|
| | E4 | E5 | E6 | E7 | E8 | E9 | CE1 | CE4 | CE5 |
| PEEK, KetaSpire ® KT-850P (%) | 60.0 | 60.0 | 60.0 | 55.0 | 50.0 | 50.0 | 100.0 | — | — |
| PPS, DIC Grade DSP LD-10G (%) | 30.0 | 30.0 | 30.0 | 30.0 | 30.0 | 25.0 | — | 100.0 | — |
| PPSU, Radel ® R-5000 NT (%) | 10.0 | 10.0 | 10.0 | 15.0 | 20.0 | 25.0 | — | — | 100.0 |
| $TiO_2$, DuPont Tipure ™ R-105 (phr) | — | 2.00 | — | — | — | — | — | — | — |
| Zinc Sulfide, Sachtolith ™ L (phr) | — | — | 2.00 | — | — | — | — | — | — |
| Chloroform | >2.0 NE | >2.0 NE | >2.0 NE | >2.0 NE | >2.0 NE | >2.0 NE | 1.1 CZ | >2.0 NE | DS |
| Methyl Ethyl Ketone (MEK) | >2.0 NE | >2.0 NE | >2.0 NE | >2.0 NE | >2.0 NE | >2.0 NE | 1.1 CZ | >2.0 NE | 0.3 CK/SS |

TABLE 3-continued

Environmental Stress Cracking Resistance (ESCR) (Critical Strain, %) of Various Ternary PEEK/PPS/PPSU Mixtures

| | Formulation No. | | | | | | | | |
|---|---|---|---|---|---|---|---|---|---|
| | E4 | E5 | E6 | E7 | E8 | E9 | CE1 | CE4 | CE5 |
| Toluene | >2.0 NE | >2.0 NE | >2.0 NE | >2.0 NE | >2.0 NE | >2.0 NE | 1.1 CZ | >2.0 NE | 0.5 CK |

Notes:
Test conditions: Immersion under stress on parabolic flex jigs for 24 hours at room temperature
Specimens annealed at 200° C. for 2 hours prior to ESCR testing. Strain levels applied over the range 0.1-2.0%
NE = No effect on test specimens up to the maximum applied strain of 2.0%
CZ = Crazing, starting at the strain level indicated
CK = Cracking starting at the strain level indicated
SS = Surface softening
DS = Test bars completely dissolved

TABLE 4

Compounding process conditions used in preparing the formulations referenced in Table 1.

| | Set Point CE1 | Actual CE1 | Set Point CE2 | Actual CE2 | Set Point CE4 | Actual CE4 | Set Point E1, CE3, E2 and E3 | Actual E1 | Actual CE3 | Actual E2 | Actual E3 |
|---|---|---|---|---|---|---|---|---|---|---|---|
| Zone 1 (° C.) | 310 | 294 | 310 | 277 | 290 | 292 | 305 | 250 | 270 | 273 | 279 |
| Zone 2 (° C.) | 345 | 344 | 345 | 346 | 390 | 354 | 345 | 318 | 331 | 334 | 339 |
| Zone 3 (° C.) | 345 | 345 | 345 | 355 | 300 | 355 | 345 | 345 | 345 | 345 | 345 |
| Zone 4 (° C.) | 345 | 345 | 345 | 355 | 305 | 355 | 345 | 345 | 345 | 345 | 345 |
| Zone 5 (° C.) | 350 | 350 | 350 | 360 | 310 | 360 | 350 | 350 | 350 | 350 | 350 |
| Die (° C.) | 350 | 350 | 350 | 360 | 310 | 360 | 350 | 350 | 350 | 350 | 350 |
| Melt Temperature (° C.) | — | 370 | — | 372 | — | 332 | — | 370 | 372 | 371 | 372 |
| Screw Speed (rpm) | 240 | 240 | 205 | 205 | 200 | 200 | — | 200 | 205 | 205 | 205 |
| Drive Torque (%) | — | 74 | — | 82 | — | 56 | — | 76 | 77 | 76 | 76 |
| Feed Rate (lb/hr) | — | 5.5 | — | 14.0 | — | 12.0 | — | 12.0 | 12.0 | 12.0 | 12.0 |
| Vacuum Level (mbar) | — | 900 | — | 900 | — | 900 | — | 900 | 900 | 900 | 900 |

TABLE 5

Compounding process conditions used in preparing certain formulations referenced in Table 2.

| | Set Point E4 to E9 | Actual E4 | Actual E5 | Actual E6 | Actual E7 | Actual E8 | Actual E9 |
|---|---|---|---|---|---|---|---|
| Zone 1 (° C.) | 305 | 281 | 283 | 277 | 283 | 292 | 290 |
| Zone 2 (° C.) | 355 | 345 | 351 | 346 | 348 | 354 | 354 |
| Zone 3 (° C.) | 355 | 355 | 355 | 355 | 355 | 355 | 355 |
| Zone 4 (° C.) | 355 | 355 | 355 | 355 | 355 | 355 | 355 |
| Zone 5 (° C.) | 360 | 360 | 360 | 360 | 360 | 360 | 360 |
| Die (° C.) | 360 | 360 | 360 | 360 | 360 | 360 | 360 |
| Melt Temperature (° C.) | — | 386 | 371 | 372 | 389 | 379 | 376 |
| Screw Speed (rpm) | 205 | 205 | 205 | 205 | 205 | 205 | 220 |
| Drive Torque (%) | — | 64 | 60 | 66 | 67 | 67 | 70 |
| Feed Rate (lb/hr) | — | 10 | 10 | 10 | 10 | 10 | 10 |
| Vacuum Level (mbar) | — | 950 | 950 | 950 | 750 | 900 | 900 |

Obviously, numerous modifications and variations of the present invention are possible in light of the above teachings. It is therefore to be understood that within the scope of the appended claims, the invention may be practiced otherwise than as specifically described herein.

The invention claimed is:

1. A thermoplastic polymer mixture (M), comprising:
at least one poly(aryl ether ketone) (P1);
at least one poly(arylene sulfide) (P2); and
3-25 wt. % of the total weight of the thermoplastic mixture (M), of a thermoplastic polymer material (P3),
wherein:
the thermoplastic polymer material (P3) is selected from the group consisting of
   a thermoplastic polymer material consisting of at least one polyphenylsulfone (P3a),
   a thermoplastic polymer material consisting of at least one poly(ether imide) (P3b),
   a thermoplastic polymer material consisting of at least one polyphenylsulfone (P3a) and at least one poly(ether imide) (P3b), and
   combinations thereof;
the combined weight amount of the poly(aryl ether ketone) (P1) and the poly(arylene sulfide) (P2), based on the total weight of the polymer mixture (M), is of at least 30%;
the weight amount of the poly(aryl ether ketone) (P1), based on the combined weight of the poly(aryl ether ketone) (P1) and the poly(arylene sulfide) (P2), is of at most 90%; and
the poly(aryl ether ketone) (P1) is a polymer of which more than 50 wt. % of the recurring units are ketone-containing recurring units (R1) selected from the group consisting of

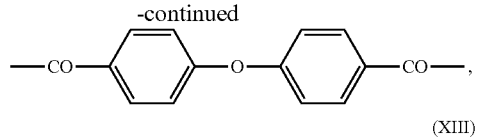

(VI)

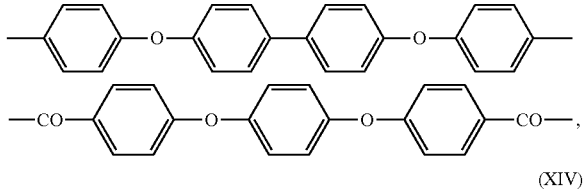

(VII), (VIII), (IX)

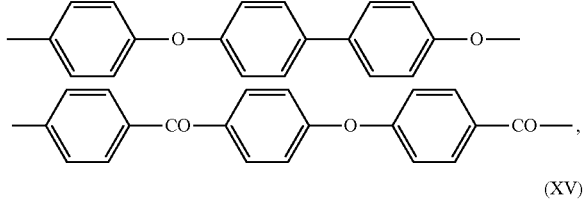

(X), (XI), (XII)

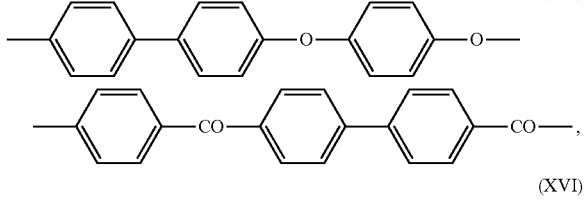

(XIII), (XIV)

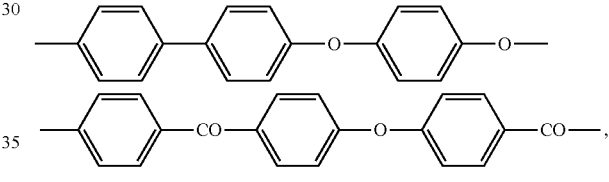

(XV), (XVI)

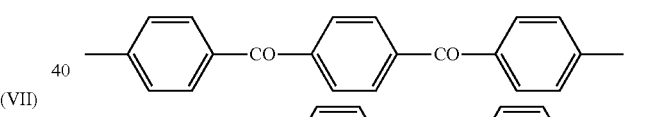

(XVII)

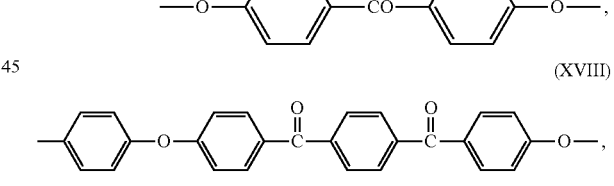

(XVII), (XVIII)

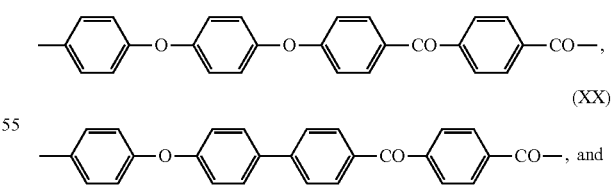

(XIX), (XX)

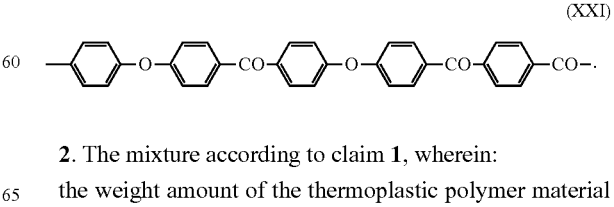

(XXI)

2. The mixture according to claim 1, wherein:
the weight amount of the thermoplastic polymer material (P3), based on the total weight of the thermoplastic mixture (M), ranges from 5 to 20 wt. %; and the combined weight amount of the poly(aryl ether ketone) (P1) and the poly(arylene sulfide) (P2), based on the total weight of the thermoplastic mixture (M), is at least 50%.

3. The mixture according to claim 2, wherein the weight amount of the poly(aryl ether ketone) (P1), based on the combined weight of the poly(aryl ether ketone) (P1) and the poly(arylene sulfide) (P2), is at least 50% and at most 90%.

4. The mixture according to claim 1, wherein:
the poly(aryl ether ketone) (P1) is a poly(ether ether ketone) homopolymer; and
the poly(arylene sulfide) (P2) is a poly(phenylene sulfide) homopolymer.

5. The mixture according to claim 1, wherein the thermoplastic polymer material (P3) consists of at least one poly (ether imide) (P3b).

6. The mixture according to claim 1, wherein the thermoplastic polymer material (P3) consists of at least one polyphenylsulfone (P3a) and at least one poly(ether imide) (P3b).

7. The mixture according to claim 1, further comprising at least one friction reducing additive.

8. The mixture according to claim 7, further comprising carbon fiber, graphite and polytetrafluoroethylene, wherein:
the combined weight amount of carbon fiber, graphite and polytetrafluoroethylene, based on the total weight of the mixture (M), ranges from 15% to 45%;
the weight amount of carbon fiber, based on the total weight of the mixture (M), ranges from 5% to 15%;
the weight amount of graphite, based on the total weight of the mixture (M), ranges from 5% to 15%; and
the weight amount of polytetrafluoroethylene, based on the total weight of the mixture (M), ranges from 5% to 15%.

9. An article, comprising the mixture according to claim 1.

10. The article according to claim 9, which is selected from the group consisting of:
a valve component or a related part thereof;
a compressor or a pump component;
a sealing component for use in a downhole environment of oil/gas production;
an electronic component;
a hard drive platter component, or a head component;
a cell cassette or a chip carrier tray;
a component of a semi-conductor test equipment;
a fitting and/or coupling of a fluid delivery system;
a matrix for structural continuous fiber composites;
a cookware or bakeware;
a downhole abrasion tape or a flexible riser abrasion tape;
an under-the-hood automotive component;
an article useful in lighting applications;
a thermally dissipative heat sink;
an aerospace electrical or electronic connector component or housing;
a bushing, a bearing, a thrust washer, or another friction and wear component;
a gear;
a mechanical drive component;
an electrical or electronic, wire or cable insulation or coating;
a bushing, bearing or another frictional component of an elevator door component, or other sliding mechanism;
a bushing, bearing or another frictional component of a high temperature conveyor system;
a plate for turbo components and/or air induction;
an hydraulic component, a seal, a poppet or a piston ring of an agricultural or construction equipment;
an anti-wear layer of a push-pull cable;
a glide ring, a tappet, a gear, an electronically driven pad, a control valve, a pump component, a bushing or a check ball of a brake system;
a seal ring, a thrust washer, or a ball of a transmission component;
a gear, a bushing or a bearing of a steering system component;
a ramp button, a torque roller, a thrust button of a CVT (Continuous Variable transmissions) or clutch;
a pump component, a gear, or a sensor of an emission system;
a pump or a G-rotor of an oil system;
a swash plate of a compressor;
an air bag sensor;
a friction plate, a door sleeve or a bracket or another sliding component of a train door;
an automotive chassis component; and
a motor thrust washer or film for seat adjustment mechanisms.

11. The mixture according to claim 1, wherein the thermoplastic polymer material (P3) consists of at least one polyphenylsulfone (P3a).

12. The mixture according to claim 11, wherein the polyphenylsulfone (P3a) is a polyphenylsulfone homopolymer.

13. The mixture according to claim 6, wherein the polyphenylsulfone (P3a) is a polyphenylsulfone homopolymer, and the poly(ether imide) (P3b) is a poly(ether imide) with essentially all of the recurring units (R3b) of one or more formulae:

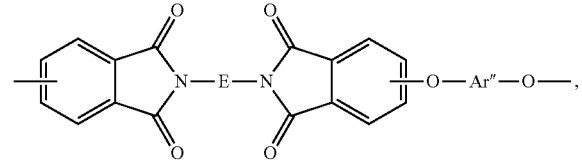

(23)

as such, and/or in their amic acid forms:

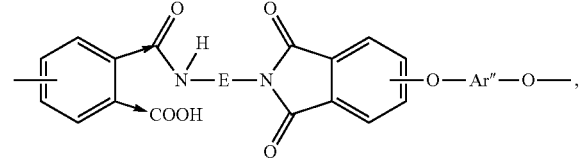

(24)

and/or:

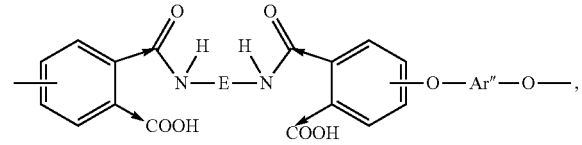

(25)

wherein:
the → denotes isomerism so that in any recurring unit the groups to which the arrows point may exist as shown or in an interchanged position;

E is selected from the group consisting of

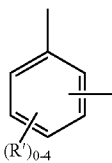
(E-i)

with the R' being, independently from each other, alkyl radicals comprising from 1 to 6 carbon atoms or C6-C10 aryls,

(E-ii)

with n=integer from 1 to 6,

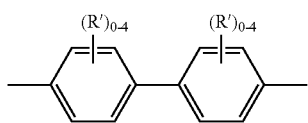
(E-iii)

with the R' being, independently from each other, alkyl radicals comprising from 1 to 6 carbon atoms, or C6-C10 aryls,

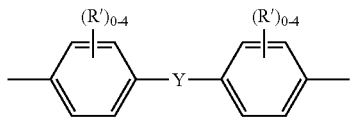
(E-iv)

with the R' being, independently from each other, alkyl radicals comprising from 1 to 6 carbon atoms, or C6-C10 aryls; and
Y is selected from the group consisting of
(Y-i) alkylenes of 1 to 6 carbon atoms,
(Y-ii) cycloalkylenes of 4 to 8 carbon atoms, and

(Y-iii)

and
Ar" is selected from the group consisting of
(Ar"-i) aromatic hydrocarbon radicals having from 6 to 20 carbon atoms and alkyl substituted derivatives thereof wherein the alkyl substituting group contains 1 to 6 carbon atoms,

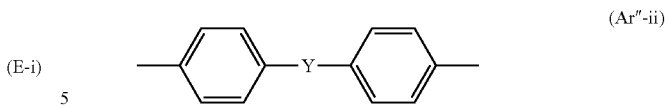
(Ar"-ii)

with Y being chosen from (Y-i), (Y-ii) and (Y-iii) as defined above,
(Ar"-iii) alkylene and cycloalkylene radicals having from 2 to 20 carbon atoms, and
(Ar"-iv) C2 to C8 alkylene terminated polydiorganosiloxanes.

14. The mixture according to claim 13, further comprising at least one friction reducing additive.

15. An article, comprising at least one part having a bearing surface, said part comprising the mixture according to claim 14.

16. The article according to claim 15, which is a bearing.

17. A thermoplastic polymer mixture (M), comprising
at least one poly(aryl ether ketone) (P1);
at least one poly(arylene sulfide) (P2); and
3-25 wt. % of the total weight of the thermoplastic mixture (M), of a thermoplastic polymer material (P3),
wherein:
the thermoplastic polymer material (P3) is selected from the group consisting of
(i) a thermoplastic polymer material consisting of at least one polyphenylsulfone (P3a),
(ii) a thermoplastic polymer material consisting of at least one poly(ether imide) (P3b),
(iii) a thermoplastic polymer material consisting of at least one poly(ether imide sulfone) (P3c),
(iv) a thermoplastic polymer material consisting of at least one polyphenylsulfone (P3a) and at least one poly(ether imide) (P3b),
(v) a thermoplastic polymer material consisting of at least one polyphenylsulfone (P3a) and at least one poly(ether imide sulfone) (P3c),
(vi) a thermoplastic polymer material consisting of at least one poly(ether imide) (P3b) and at least one poly(ether imide sulfone) (P3c), and
(vii) a thermoplastic polymer material consisting of at least one polyphenylsulfone (P3a), at least one poly(ether imide) (P3b) and at least one poly(ether imide sulfone) (P3c);
the combined weight amount of the poly(aryl ether ketone) (P1) and the poly(arylene sulfide) (P2), based on the total weight of the polymer mixture (M), is of at least 30%;
the weight amount of the poly(aryl ether ketone) (P1), based on the combined weight of the poly(aryl ether ketone) (P1) and the poly(arylene sulfide) (P2), is of at most 90%; and
the poly(aryl ether ketone) (P1) is a polymer of which more than 50 wt. % of the recurring units are ketone-containing recurring units (R1) selected from the group consisting of

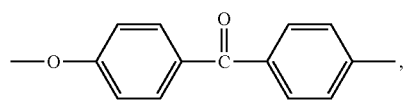
(VI)

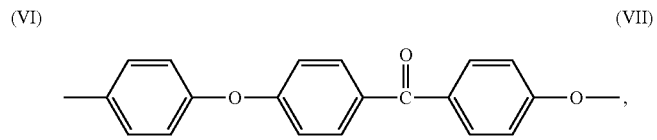
(VII)

-continued

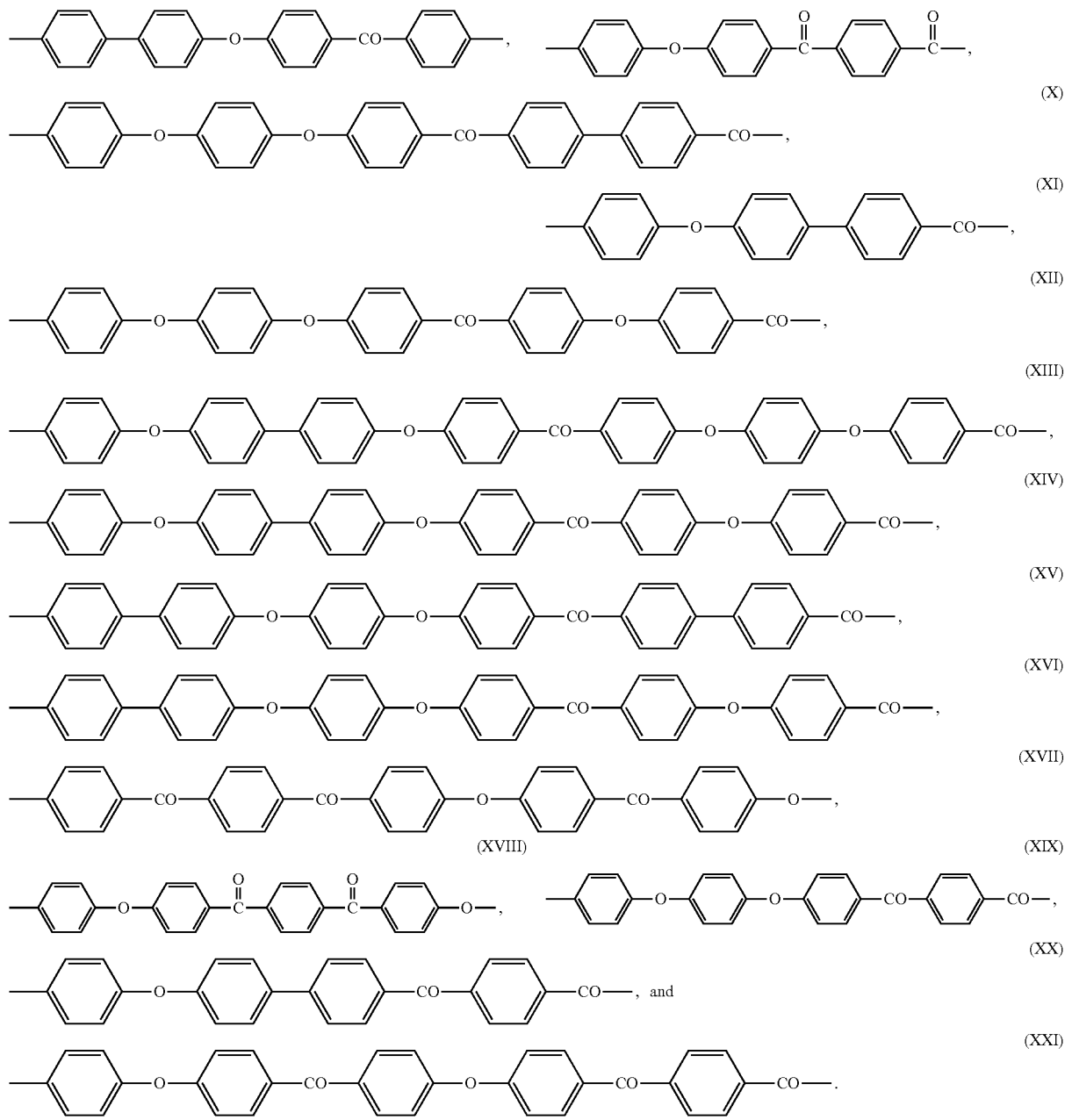

18. A method for increasing a property of a thermoplastic polymer mixture in the need thereof,
    said property being selected from the group consisting of the notched Izod, the tensile yield elongation, the tensile elongation at break, and the heat deflection temperature,
    said thermoplastic polymer mixture comprising at least one poly(aryl ether ketone) (P1) and at least one poly(arylene sulfide) (P2),
    said method comprising melt compounding the poly(aryl ether ketone) (P1) and the poly(arylene sulfide) (P2) with a thermoplastic polymer material (P3) selected from the group consisting of:
        a thermoplastic polymer material consisting of at least one polyphenylsulfone (P3a),
        a thermoplastic polymer material consisting of at least one poly(ether imide) (P3b),
        a thermoplastic polymer material consisting of at least one poly(ether imide sulfone) (P3c),
        a thermoplastic polymer material consisting of at least one polyphenylsulfone (P3a) and at least one poly(ether imide) (P3b),
        a thermoplastic polymer material consisting of at least one polyphenylsulfone (P3a) and at least one poly(ether imide sulfone) (P3c),
        a thermoplastic polymer material consisting of at least one poly(ether imide) (P3b) and at least one poly(ether imide sulfone) (P3c), and a thermoplastic polymer material consisting of at least one poly(biphenyl ether sulfone) (P3a), at least one poly(ether imide) (P3b) and at least one poly(ether imide sulfone) (P3c);

wherein the poly(aryl ether ketone) (P1) is a polymer of which more than 50 wt. % of the recurring units are ketone-containing recurring units (R1) selected from the group consisting of

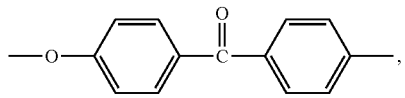

(VI)

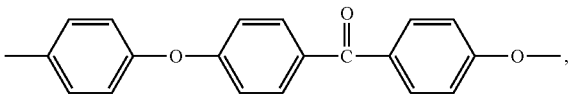

(VII)

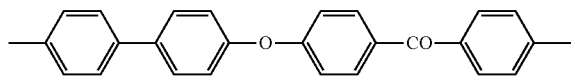

(VIII)

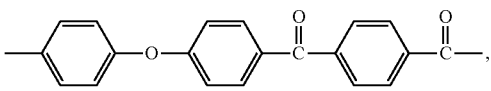

(IX)

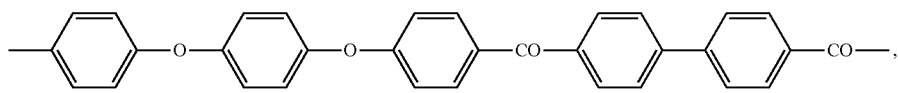

(X)

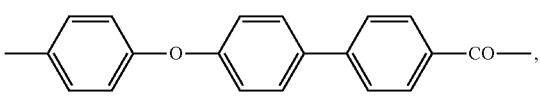

(XI)

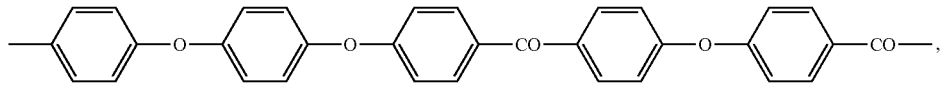

(XII)

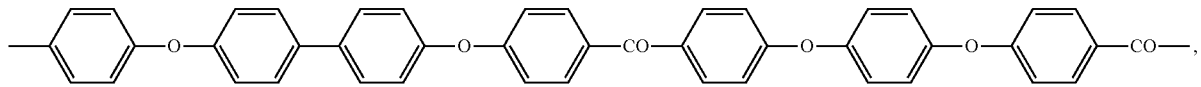

(XIII)

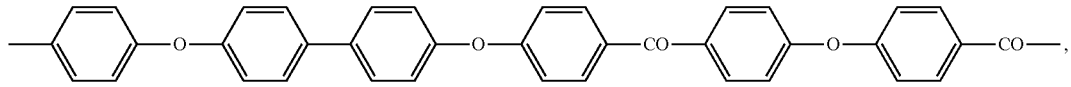

(XIV)

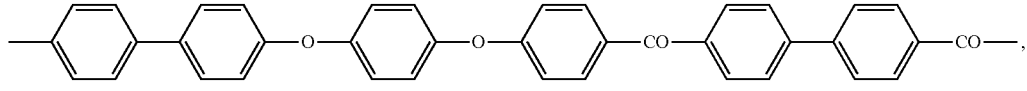

(XV)

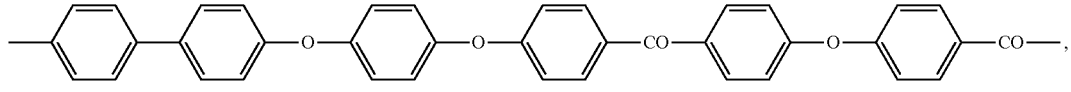

(XVI)

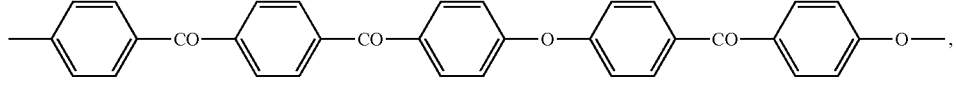

(XVII)

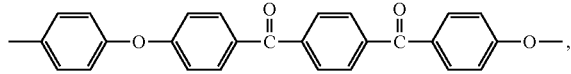

(XVIII)

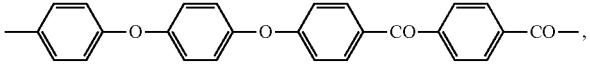

(XIX)

-continued

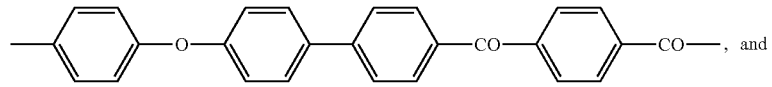
(XX)

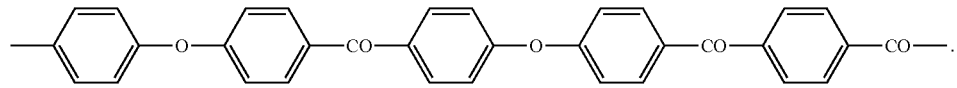
(XXI)

19. The mixture according to claim 1, comprising the polyphenylsulfone (P3a) which is a polycondensation polymer of which more than 50 wt. % of the recurring units are recurring units of the following formula:

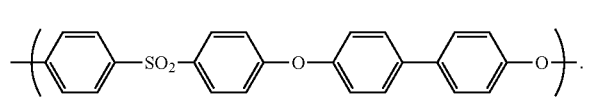

20. The mixture according to claim 17, comprising the polyphenylsulfone (P3a) which is a polycondensation polymer of which more than 50 wt. % of the recurring units are recurring units of the following formula:

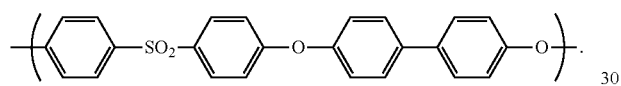

21. The method according to claim 18, wherein the thermoplastic polymer mixture comprises the polyphenylsulfone (P3a) which is a polycondensation polymer of which more than 50 wt. % of the recurring units are recurring units of the following formula:

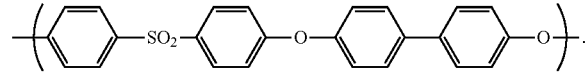

22. The thermoplastic polymer mixture (M) according to claim 1, consisting essentially of:
   the at least one poly(aryl ether ketone) (P1);
   the at least one poly(arylene sulfide) (P2);
   3-25 wt. % of the thermoplastic polymer material (P3), based on the total weight of the thermoplastic polymer mixture (M); and
   optionally at least one friction reducing additive,
   wherein the at least one poly(aryl ether ketone) (P1) is a homopolymer.

23. The mixture according claim 13, wherein the poly(ether imide) (P3b) is a poly(ether imide) homopolymer of which essentially all the recurring units are of formula (28) in imide form:

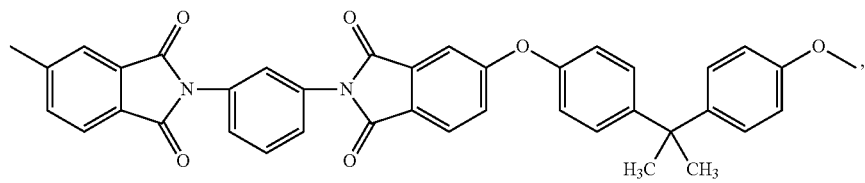
(28)

and/or in amic acid form of formula (29):

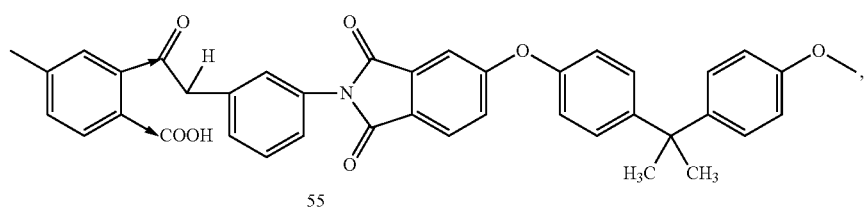
(29)

and/or in amic acid form of formula (30):

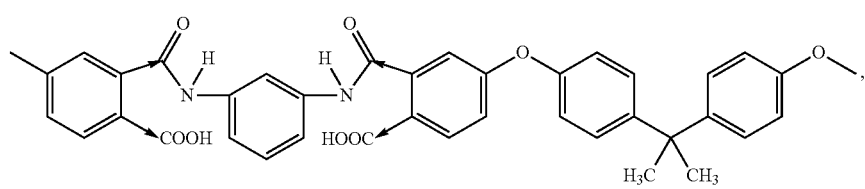
(30)

24. An article, comprising at least one part having a bearing surface, said part comprising the mixture according to claim 14.

* * * * *